(12) United States Patent
Asada

(10) Patent No.: US 6,994,181 B2
(45) Date of Patent: Feb. 7, 2006

(54) ELECTRIC POWER STEERING DEVICE AND METHOD AND APPARATUS FOR MANUFACTURING THE SAME

(75) Inventor: Atsuhisa Asada, Obu (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 10 days.

(21) Appl. No.: 10/691,543

(22) Filed: Oct. 24, 2003

(65) Prior Publication Data

US 2005/0016789 A1 Jan. 27, 2005

(30) Foreign Application Priority Data

Oct. 24, 2002 (JP) .............................. 2002-309252

(51) Int. Cl.
*B62D 5/04* (2006.01)

(52) U.S. Cl. ..................................... 180/446
(58) Field of Classification Search ................ 180/443, 180/446
See application file for complete search history.

(56) References Cited

U.S. PATENT DOCUMENTS

| | | | |
|---|---|---|---|
| 5,028,852 A | * | 7/1991 | Dunfield ..................... 318/254 |
| 5,067,577 A | | 11/1991 | Morishita |
| 5,072,166 A | | 12/1991 | Ehsani |
| 5,254,914 A | * | 10/1993 | Dunfield et al. ............ 318/254 |
| 5,382,889 A | * | 1/1995 | Peters et al. ................ 318/254 |

(Continued)

FOREIGN PATENT DOCUMENTS

DE 197 12 869 10/1998

(Continued)

*Primary Examiner*—Kevin Hurley
(74) *Attorney, Agent, or Firm*—Oblon, Spivak, McClelland, Maier & Neustadt, P.C.

(57) ABSTRACT

An electric power steering device according to the embodiment disclosed herein employs, in addition to a motor resolver of an electric motor for assisting the rotational manipulation of a steering shaft, first and second resolvers which are made different in the number of N-S pole pairs from each other each for detecting the rotational position of the steering shaft. The reduction gear ratio of a reduction gear mechanism of a ball screw mechanism driven by the electric motor is set so that a calculated value which is obtained by multiplying the reduction gear ratio with the number of pole pairs of a motor resolver represents a non-integer having a numerical value of the decimal place. Thus, it does not occur that calculated value becomes an integer which does not have any numerical value of the decimal place. As a result, it can be realized that the mechanical angle of the steering wheel which is calculated based on electrical angles of the first and second resolvers can be made not take the same value within any one-rotational range unit as that within another one-rotational range unit of four rotations in total of the steering wheel including two left rotations and two right rotations. Consequently, it becomes possible to detect the absolute rotational position of the steering wheel precisely, so that the motor for assisting the steering manipulation can reliably be controlled in dependence on the absolute rotational position of the steering wheel so precisely detected.

3 Claims, 11 Drawing Sheets

U.S. PATENT DOCUMENTS

| | | |
|---|---|---|
| 5,786,754 A | 7/1998 | Parker |
| 5,845,222 A | 12/1998 | Yamamoto et al. |
| 5,880,367 A * | 3/1999 | Vaughn ........................ 73/488 |
| 5,930,905 A | 8/1999 | Zabler et al. |
| 5,978,721 A | 11/1999 | Kagawa et al. |
| 6,008,599 A | 12/1999 | Beck |
| 6,354,396 B1 | 3/2002 | Horton et al. |
| 6,364,050 B1 | 4/2002 | Horton |
| 6,469,499 B2 * | 10/2002 | Delaporte .............. 324/207.13 |
| 6,519,549 B1 | 2/2003 | Lin et al. |
| 6,597,141 B1 | 7/2003 | Wilson-Jones et al. |
| 2002/0040531 A1 | 4/2002 | Schodlbauer |
| 2004/0210366 A1 * | 10/2004 | Tomita ........................ 701/41 |

FOREIGN PATENT DOCUMENTS

| | | |
|---|---|---|
| DE | 101 37 098 | 2/2002 |
| EP | 1 026 068 | 8/2000 |
| EP | 1 193 472 | 4/2002 |
| JP | 59-226806 | 12/1984 |
| JP | 7-2135 | 1/1995 |
| JP | 2003329524 A * | 11/2003 |

* cited by examiner

ELECTRIC POWER STEERING DEVICE AND METHOD AND APPARATUS FOR MANUFACTURING THE SAME

INCORPORATION BY REFERENCE

This application is based on and claims priority under 35 U.S.C. sctn. 119 with respect to Japanese Application No. 2002-309252 filed on Oct. 24, 2002, the entire content of which is incorporated herein by reference.

BACKGROUND OF THE INVENTION

1. Field of the Invention

The present invention relates to an electric power steering device for employing an electric motor to assisting the steering force applied to road wheels. It further relates a method and apparatus for manufacturing the electric power steering device.

2. Discussion of the Related Art

Heretofore, there have been known electric power steering devices of the type that a steering mechanism connected to a steering shaft is given an assist force generated by an electric motor thereby to reduce the steering force to be applied to a steering wheel. In an electric power steering device of this kind, the steering wheel is rotated more than one full turn to the left and more than one full turn to the right within a limited rotational range. Thus, a neutral position of the steering wheel is assumed to be "the position that the steering wheel takes while the vehicle runs straight ahead", and a steering angle is grasped by detecting as an absolute position the position to which the steering wheel is turned from the neutral position to the left or right.

And, the steering angle of the steering wheel is usually detected by the use of a rotary angle sensor which is composed of, e.g., a slit disc rotating with the steering shaft and a photo interrupter. For example, taking the configuration like "the steering sensor and the power steering device" disclosed on pages 2 to 8 and FIGS. 1 to 4 in Japanese unexamined, published patent application No. 2002-145095, it can be realized to precisely detect the neutral position of the steering wheel with a single rotary angle sensor.

By the way, steering wheels of vehicles are generally of the construction that the angle of steered wheels (usu., front wheels) over the whole range cannot be controlled through the steering within one rotation (360 degrees). For example, as the steering wheel is turned from the center or the neutral position two rotations (720 degrees) in the left direction and two rotations (720 degrees) in the right direction, the steering wheel is capable of varying its steering angle as desired within a predetermined angular range by rotating the steering wheel through 720 degrees toward the plus side or the minus side. For this reason, even where the same construction is taken as "the steering sensor and the power steering device" disclosed in the aforementioned Japanese application, it is impossible to detect the absolute rotational position of the steering wheel in addition to the rotational angle thereof by the use of one rotary angle sensor. Therefore, plural rotary angle sensors have to be combined in detecting the absolute rotational position. However, since in another aspect, the construction using the plural rotary angle sensors directly results in increasing the product cost as well as in heightening the frequency of trouble occurrence, such construction as to increase the number of components is difficult to adopt as a matter of the fact.

Another electric power steering device has also been known, wherein there are employed a resolver as means for detecting the rotational position of an electric motor which generates the assisting force and another resolver as means for detecting the steering torque generated by a steering wheel. However, it was found through researches of the present inventor that it may occur in depend no on some angular positions of the steering wheel that the latter known electric power steering device cannot precisely distinguish some absolute rotational positions from others precisely or definitely.

SUMMARY OF THE INVENTION

Accordingly, it is a primary object of the present invention to provide an improved electric power steering device capable of precisely detecting the absolute rotational position of a steering wheel even under the condition of error factors being involved therein, so that a motor for assisting the steering manipulation can be controlled based on the absolute rotational position of the steering wheel so precisely detected.

Another object of the present invention is to provide an improved method and apparatus for manufacturing an electric power steering device which is capable of precisely detecting the absolute rotational position of a steering wheel even under the condition of error factors being involved therein, so that there can be manufactured an electric power steering device which can be operated reliably in dependence on the absolute rotational position of the steering wheel so precisely detected.

Briefly, according to the present invention, there is provided an electric power steering device, which comprises a steering wheel, a first resolver for detecting a first steering angle indicating the rotational angle of a steering shaft connected to the steering wheel, and a second resolver having pole pairs different in number from those of the first resolver for detecting a second steering angle indicating the rotational angle of the steering shaft. The electric power steering device further comprises an electric motor for assisting the steering operation performed by a steering mechanism connected to the steering shaft, through a reduction gear mechanism, and a third resolver for detecting a motor electrical angle indicating the rotational angle of the electric motor. The electric power steering device is capable of controlling the electric motor based on the absolute rotational position of the steering wheel which is calculated from the first and second steering angles and the motor electrical angle. And, at least one of the reduction gear ratio of the reduction gear mechanism and the number of pole pairs of the third resolver is set so that a calculated value which is obtained by multiplying the reduction gear ratio with the number of the pole pairs represents a non-integer having a numerical value of the decimal place. Herein, the expression "pole pairs" means the gathering of plural pairs each pair of which comprise one N-pole and one S-pole.

With this construction, since at least one of the reduction gear ratio of the reduction gear mechanism and the number of pole pairs of the third resolver is set so that the calculated value which is obtained by multiplying the reduction gear ratio with the number of the pole pairs represents a non-integer having a numerical value of the decimal place, it does not occur that the calculated value has zero as its numerical value of the decimal place, in other words, the calculated value becomes an integer. Thus, the steering angle (0 to 360 degrees) within one revolution of the steering wheel which is obtained from the first steering angle of the first resolver and the second steering angle of the second resolver can be made not take the same value within any one-rotational range unit as that within another one-rotational range unit of the plural left and right rotations of the steering wheel. Consequently, it becomes possible to detect the absolute rotational position of the steering wheel precisely, so that the motor for assisting the steering manipulation can reliably be controlled in dependence on the absolute rotational position of the steering wheel so precisely detected.

In another as aspect of the present invention, a method of manufacturing an electric power steering device is provided, wherein the electric power steering device comprises a steering wheel, a first resolver for detecting a first steering angle indicating the rotational angle of a steering shaft connected to the steering wheel, a second resolver having pole pairs different in number from those of the first resolver for detecting a second steering angle indicating the rotational angle of the steering shaft, an electric motor for assisting the steering operation performed by a steering mechanism connected to the steering shaft, through a reduction gear mechanism, and a third resolver for detecting a motor electrical angle indicating the rotational angle of the electric motor. The electric power steering device is capable of controlling the electric motor based on the absolute rotational position of the steering wheel which is calculated from the first and second steering angles and the motor electrical angle. The method of manufacturing the electric power steering device as constructed above includes the step of setting at least one of the reduction gear ratio of the reduction gear mechanism and the number of pole pairs of the third resolver so that a calculated value which is obtained by multiplying the reduction gear ratio with the number of the pole pairs of the third resolver represents a non-integer which has a numerical value of the decimal place within one of numerical ranges "0.17 to 0.28", "0.39 to 0.42", "0.58 to 0.61" and "0.72 to 0.83".

In a further aspect of the present invention, an apparatus for manufacturing an electric power steering device is provided, wherein the electric power steering device comprises a steering wheel, a first resolver for detecting a first steering angle indicating the rotational angle of a steering shaft connected to the steering wheel, a second resolver having pole pairs different in number from those of the first resolver for detecting a second steering angle indicating the rotational angle of the steering shaft, an electric motor for assisting the steering operation performed by a steering mechanism connected to the steering shaft, through a reduction gear mechanism, and a third resolver for detecting a motor electrical angle indicating the rotational angle of the electric motor. The electric power steering device is capable of controlling the electric motor based on the absolute rotational position of the steering wheel which is calculated from the first and second steering angles and the motor electrical angle. The apparatus for manufacturing the electric power steering device as constructed above further includes means for setting at least one of the reduction gear ratio of the reduction gear mechanism and the number of pole pairs of the third resolver so that a calculated value which is obtained by multiplying the reduction gear ratio with the number of the pole pairs of the third resolver represents a non-integer which has a numerical value of the decimal place within one of numerical ranges "0.17 to 0.28", "0.39 to 0.42", "0.58 to 0.61" and "0.72 to 0.83".

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

Figure 11A:
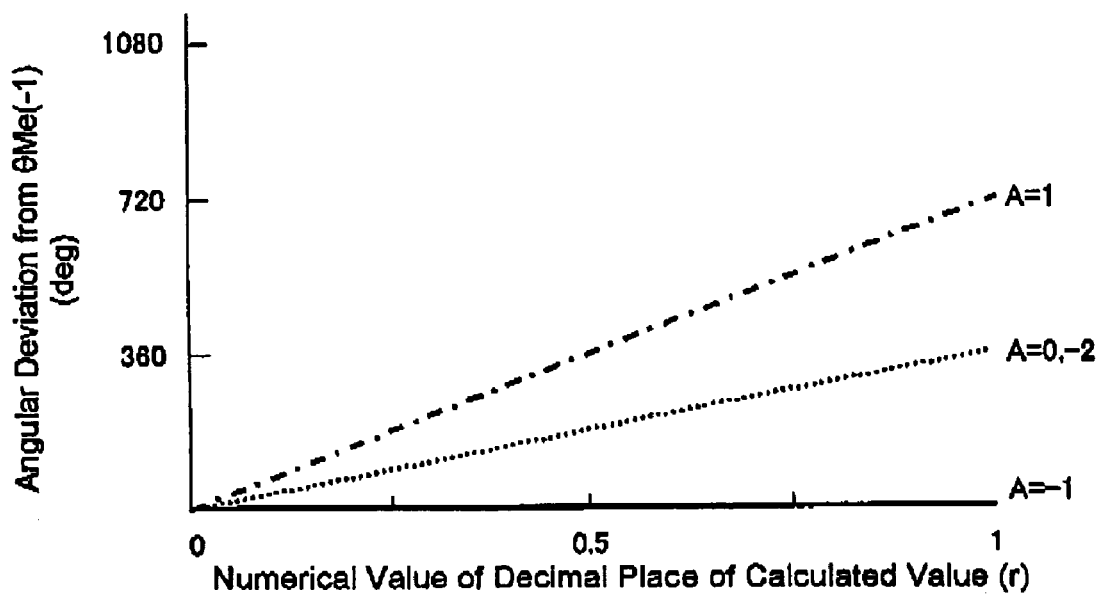
Figure 11B:
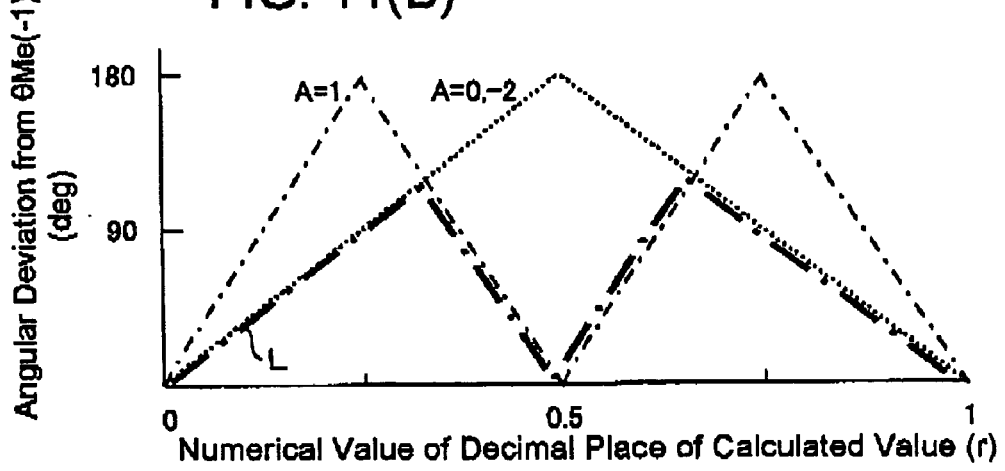

FIG. 11(A) is a characteristic graph showing the deviations from calculated motor electrical angles $\theta Me(-1)$ in connection with the variation in the numerical value of the decimal place of the calculated value (r); and FIG. 11(B) is a similar characteristic graph (zigzag line L) wherein the deviations shown in FIG. 11(A) are represented as being turned back each time of reaching the deviation of 180-degrees.

DETAILED DESCRIPTION OF THE PREFERRED EMBODIMENT

Hereafter, an electric power steering device and a method and apparatus for manufacturing the same in the embodiment according to the present invention will be described with reference to the accompanying drawings.

Figure 1:
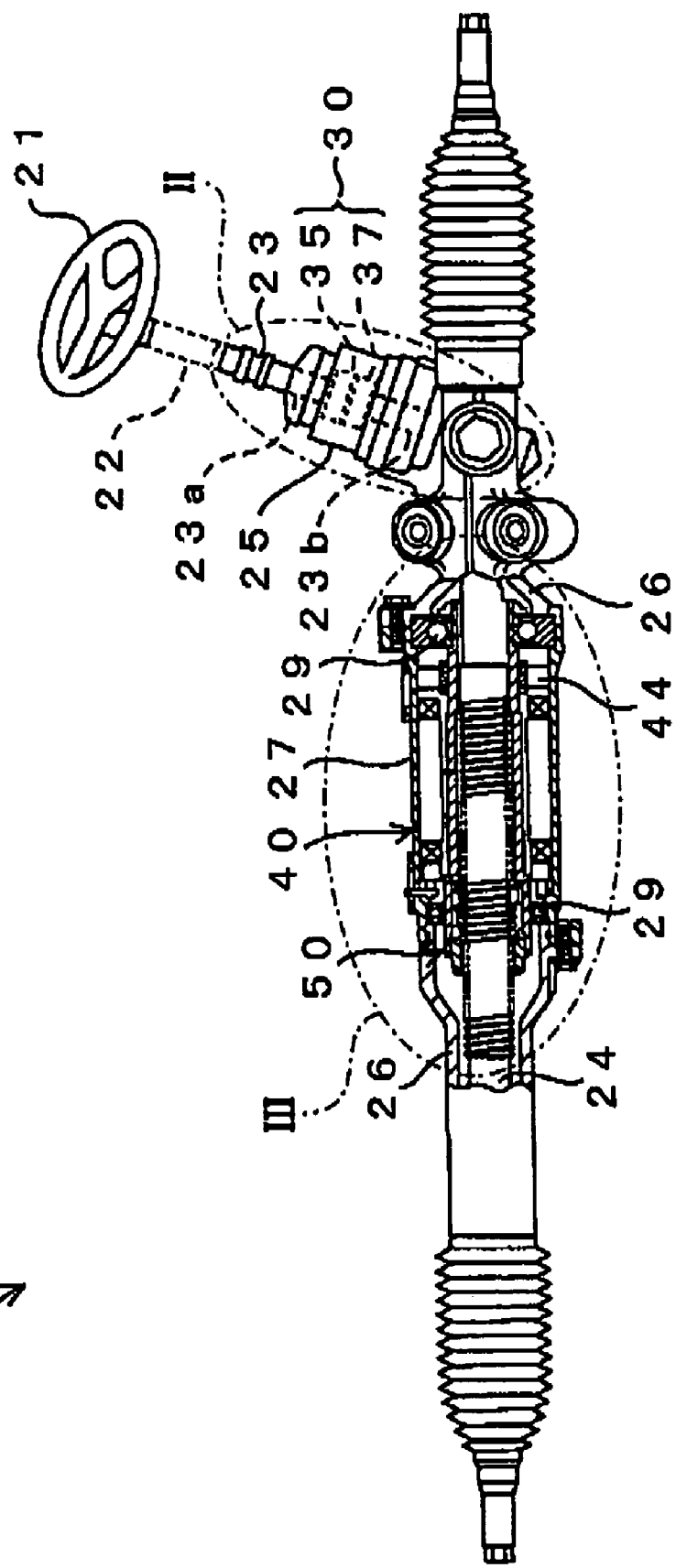
FIG. 1 is an external view partly in section of an electric power steering device of an embodiment according to the present invention.

First of all, the construction of an electric power steering device 20 in the embodiment according to the present invention will be described with reference to FIGS. 1 through 6. As shown in FIGS. 1 and 5, the electric power steering device 20 is primarily composed of a steering wheel 21, a steering shaft 22, a pinion shaft 23, a rack shaft 24, a torque sensor 30, an electric motor 40, a motor resolver 44, a ball screw mechanism 50, an ECU (Electronic Control Unit) 60 and the like. The device 20 detects the steering state on the steering wheel 21 and assists the steering manipulation of the driver by controlling the electric motor 40 to generate an assist force depending on the steering state. Opposite ends of the rack shaft 24 are connected to steerable road wheels (usu., front wheels (not shown)) through tie rods and the like, respectively.

Figure 2:
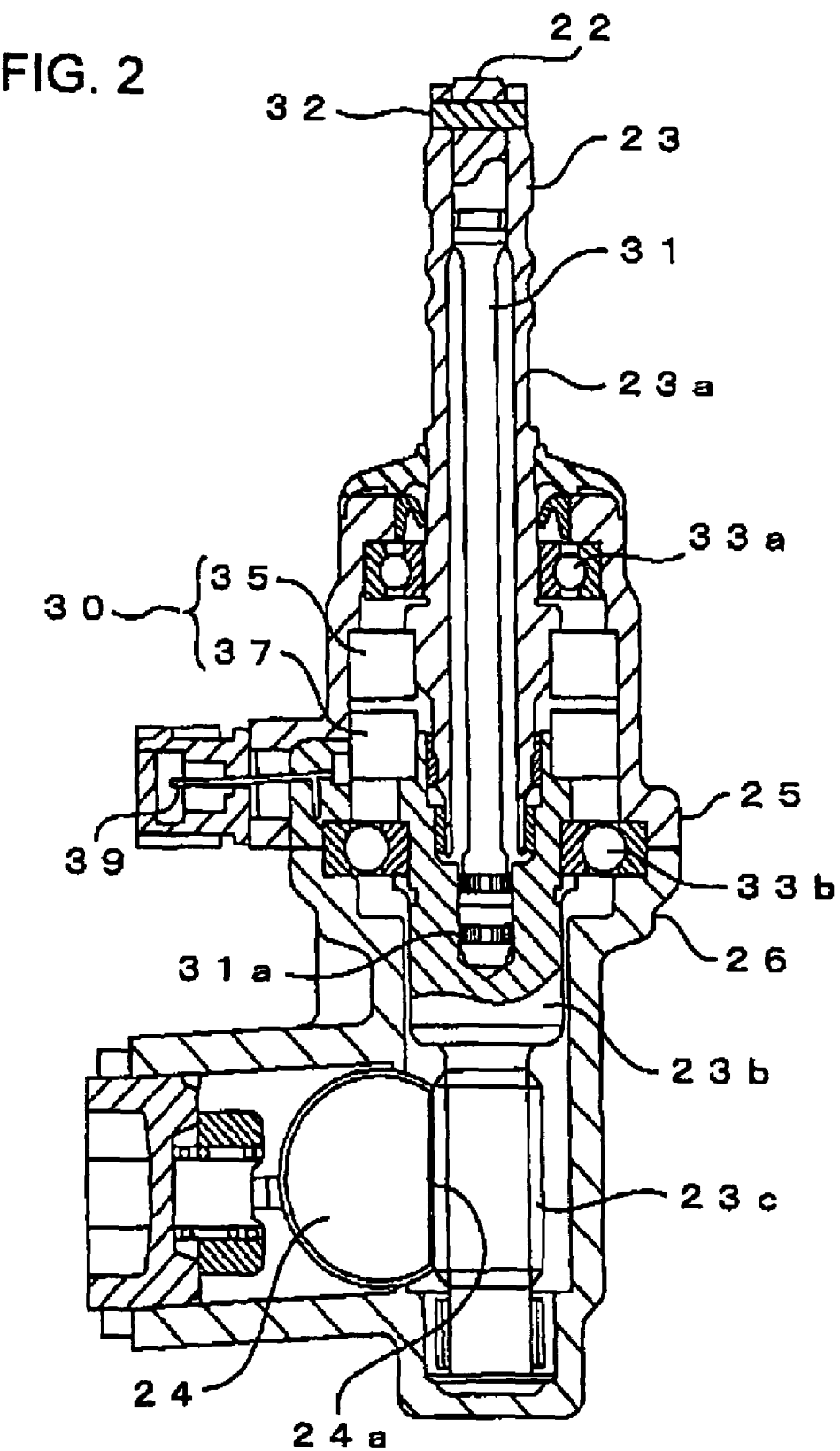
FIG. 2 is an enlarged view of the part encircled by a one-dot chain line II in FIG. 1.

More specifically, as shown in FIGS. 1 and 2, the steering wheel 21 is connected to one end of the steering shaft 22, whose other end 18 connected by means of a pin 32 to an input shaft 23a of the toque sensor 30 and a torsion bar 31 which are both received in a pinion housing 25. The other end 31a of the torsion bar 31 is spline-connected to an output shaft 23b of the pinion shaft 23.

The input shaft 23a and the output shaft 23b of the pinion shaft 23 are rotatably supported within the pinion housing 25 respectively through bearings 33a and 33b. A first resolver 35 constituting the torque sensor 30 is interposed between the input shaft 23a and the pinion housing 25, while a second resolver 37 also constituting the torque sensor 30 is interposed between the output shaft 23b and the pinion housing 25. The first and second resolvers 35, 37 are each capable of detecting the steering angle of the steering wheel 21 and are electrically connected to the ECU 60 through respective terminals 39, as typically shown in FIG. 5. The constructions of these resolvers 35, 37 will be described later in detail.

At an extreme end portion of the output shaft 23b of the pinion shaft 23, there is formed a pinion gear 23c, to which a rack gear 24a on the rack shaft 24 is connected in meshing engagement. Thus, a rack-and-pinion mechanism is constructed in this manner.

With this construction, the steering shaft 22 and the pinion shaft 23 are connected by means of a torsion bar 31 to be rotatable relative to each other through the torsion of the torsion bar 31, and the rotational angle of the steering shaft 22 or the rotational angle (mechanical angle) θTm of the steering wheel 21 can be detected based on a first steering angle (electrical angle) θT1 and a second steering angle (electrical angle) θT2 which are detected respectively by the first and second resolvers 35, 37. Further, a torsional quantity (corresponding to the steering torque) can be detected as torsional angle based on the angular difference between the first steering angle θT1 and the second steering angle θT2, the ratio therebetween or the like.

Figure 3:
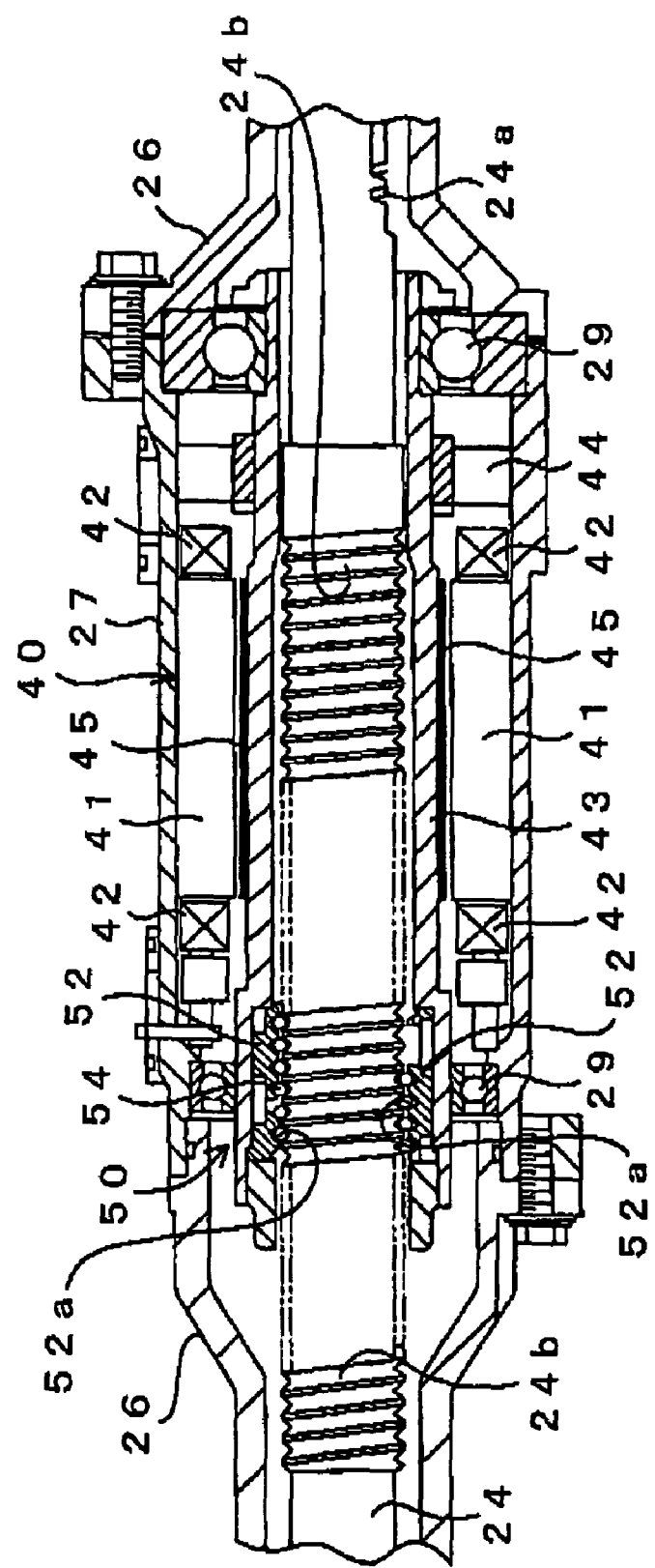
FIG. 3 is another enlarged view of the part encircled by a one-dot chain line in FIG. 1.

As shown in FIGS. 1 and 3, the rack shaft 24 is housed within a rack housing 26 and a motor housing 27 to pass therethrough and is formed with a male ball screw 24b at the intermediate portion thereof. Around the ball screw 24b, a motor shaft 43 like a cylindrical sleeve is supported by bearings 29 to be rotatable in coaxial alignment with the rack shaft 24. The motor shaft 43, together with an exciting coil 42 and the like, constitutes the electric motor 40, wherein a field system that is generated by the exciting coil 42 wound around a stator 42 acts on permanent magnets 45 arranged on the external surface of the motor shaft 43 serving as a rotor, so that the motor shaft 43 can be rotated.

The motor shaft 43 has a ball nut 52 fit on its internal surface to be rotatable bodily therewith. A female ball screw 52a is formed at the internal surface of the ball nut 52. A plurality of balls 54 are interposed between the female ball screw 52a of th ball screw nut 52 and the male ball screw 24b of the rack shaft 24. This constitutes a ball screw mechanism 50 capable of moving the rack shaft 24 in the axial direction thereof upon rotation of the motor shaft 43.

That is, the ball screw mechanism 50 composed of the both ball screws 24b, 52a and the like is able to convert the rotational torque in the positive-going and negative-going directions of the motor shaft 43 into the reciprocating motion of th rack shaft 24 in the axial direction thereof. Thus, the reciprocating motion becomes the assist force which reduces the manipulation or steering force to be exerted on th steering wheel 21, through the pinion shaft 23 constituting the rack-and-pinion mechanism together with the rack shaft 24.

A motor resolver 44 capable of detecting the rotational angle (electrical angle) θMe of the motor shaft 43 is interposed between the motor shaft 43 of the motor 40 and the motor housing 27. The resolver 44 is electrically connected to the ECU 60 through terminals (not shown), as shown in FIG. 5.

Now, the constructions of the first resolver 35, the second resolver 37 and the motor resolver 44 will be described with reference to FIG. 4(A). Since these resolvers are substantially the same to one another in construction, the first resolver 35 is typically described with respect to those portions common to all the resolvers.

Figure 4A:
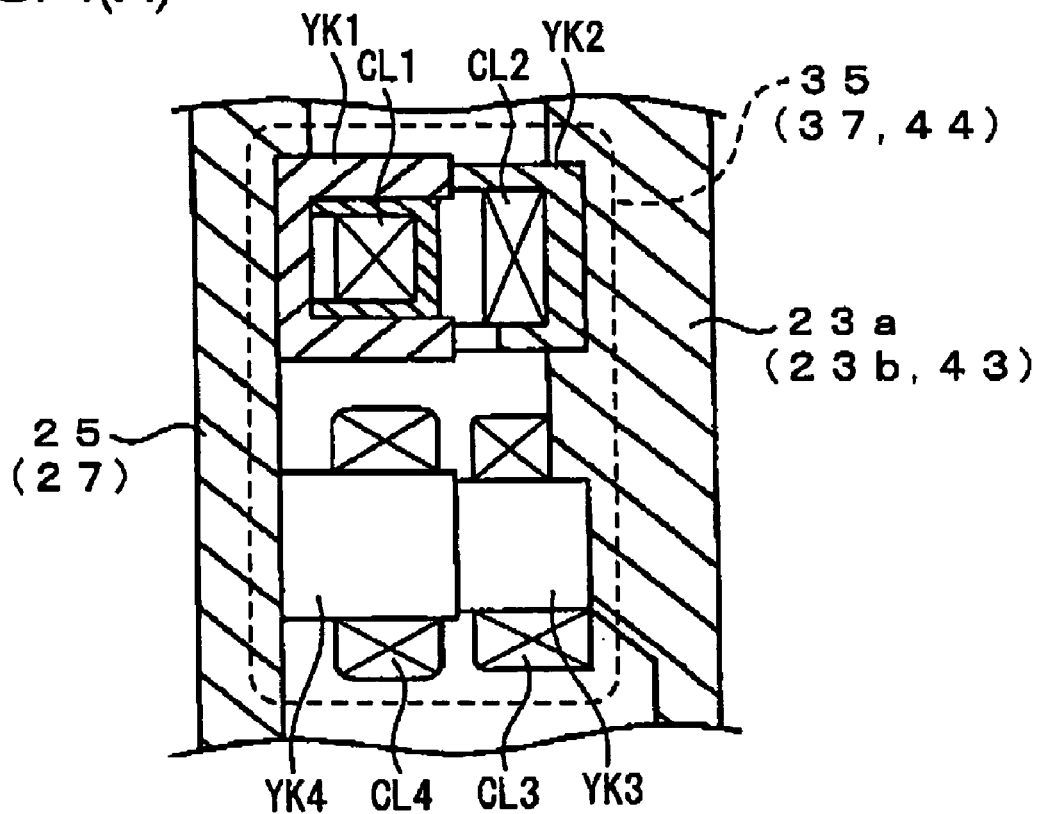
FIG. 4(A) is an explanatory view of resolvers used in the electric power steering device of the embodiment.
Figure 5:
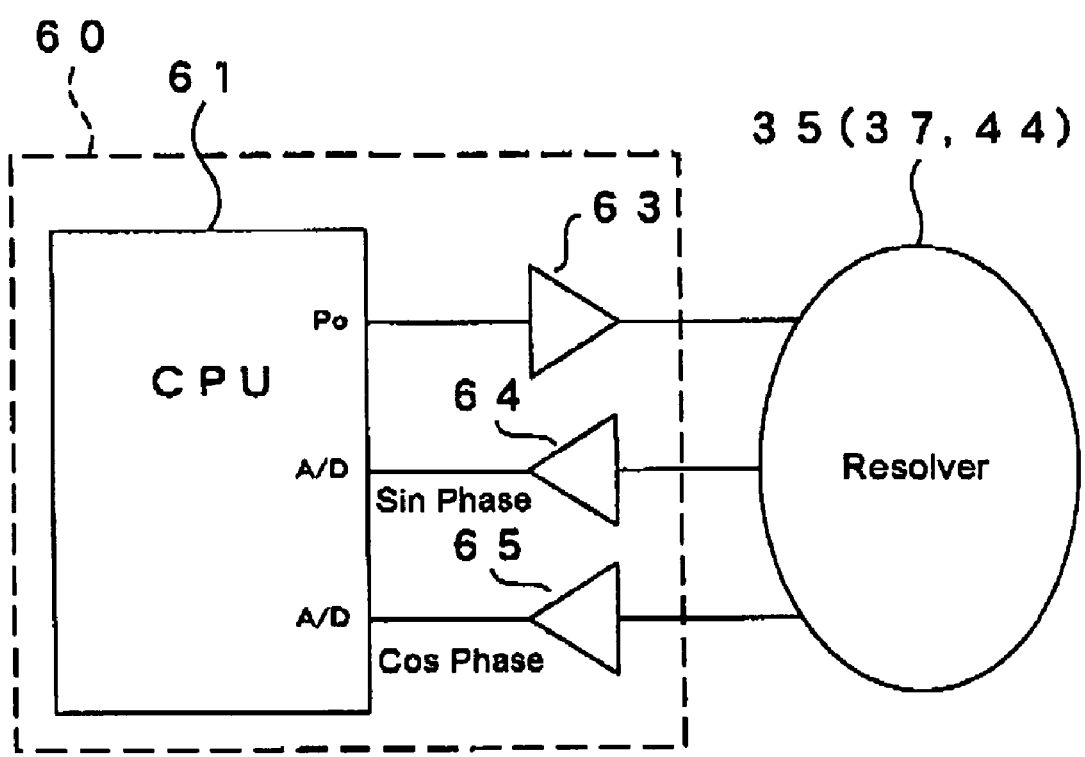
FIG. 5 is a block diagram showing the configuration in connection between an ECU controlling the electric power steering device of the embodiment and each of the resolvers.

As shown in FIG. 4(A), the first resolver 35 is composed of a first yoke YK1, a second yoke YK2, a third yoke YK3 and a fourth yoke YK4, a first coil CL1, a second coil CL2, a third coil CL3 and a fourth coil CL4, and is of the type having five pole pairs (i.e., a so-called 5×). The term "the number of pole pairs" will be described later.

The first yoke YK1 is formed as an annular cylinder encircled by the internal surface of the pinion housing 25 and is secured to the pinion housing 25. The first coil CL1 is wound along the internal surface of the first yoke YK1. On the other hand, the second yoke YK2 is formed also as an annular cylinder like the first yoke YK1 and is secured to the circumferential surface of the input shaft 23a of the pinion shaft 23 to face the first yoke YK1. The second coil CL2 is wound along the external surface of the second yoke YK2. Thus, the second yoke YK2 is rotatable bodily with the input shaft 23a.

The third yoke YK3 is secured to the circumferential surface of the input shaft 23a at a position shifted axially from the second yoke YK2 and thus, is rotatable with the input shaft 23a. The third coil CL3 is wound on the third yoke YK3 and is electrically connected to the second coil CL2 of the second yoke YK2 in electrically parallel relation. On the contrary, like the first yoke YK1, the fourth yoke YK4 is formed as an annular cylinder encircled by the internal surface of the pinion housing 25 and is secured to the pinion housing 25. Each of the third and fourth coils CL3, CL4 is composed of two kinds of coils whose phases are shifted 90 degrees from each other, as schematically shown in FIG. 5(B).

The second resolver 37 is constructed like the first resolver 35 except that the second yoke YK2, the third yoke YK3, the second coil CL2 and the third coil CL3 are provided on the output shaft 23b and that the number of the pole pairs is six (so-called "6×").

Further, the motor resolver 44 is constructed also like the first resolver 35, but is different from the same in the following respects. In this motor resolver 44, the first yoke YK1, the fourth yoke YK4, the first coil CL1 and the fourth coil YK4 ar provided on the internal surface of the motor housing 27, while the second yoke YK2, the third yoke YK3, the second coil CL2 and the third coil CL3 are provided on the circumferential surface of the motor shaft 43. Further, the number of the pole pairs in the motor resolver 44 is seven (so-called "7×").

Next, the electrical characteristics of the first resolver 35, the second resolver 37 and the motor resolver 44 will be described with reference to FIG. 4(B). These resolvers are almost the same in electrical characteristic as one another, and therefore, the first resolver 35 will be typically described.

As mentioned earlier, the first resolver 35 is composed of the first to fourth coils CL1–CL4 and is of the type so-called "one exciting phase, two output phases" (voltage detection type). Therefore, an exciting signal E1 which is output from an output port P0 of a CPU 61 constituting the ECU 60 is applied to the first coil CL1 and the second coil CL2 constituting a transformer, through a buffer amplifier 63 of the ECU 60 and is further applied to the third coil CL3 serving as one exciting phase. As a result, resolver output signals E2 and E3 depending on a detection angle θ (electrical angle) can be obtained from the fourth coil CL4 including two output phase coils. Then, since the resolver output signals output from the first resolver 35 are analogue signals composed of a sine-phase signal and a cosine-phase signal, they are converted into digital signals which the CPU 61 can process, by being input into respective A-D (Analogue-to-Digital) converters incorporated in the CPU 61 through buffer amplifiers 64, 65 of the ECU 60.

Figure 6:
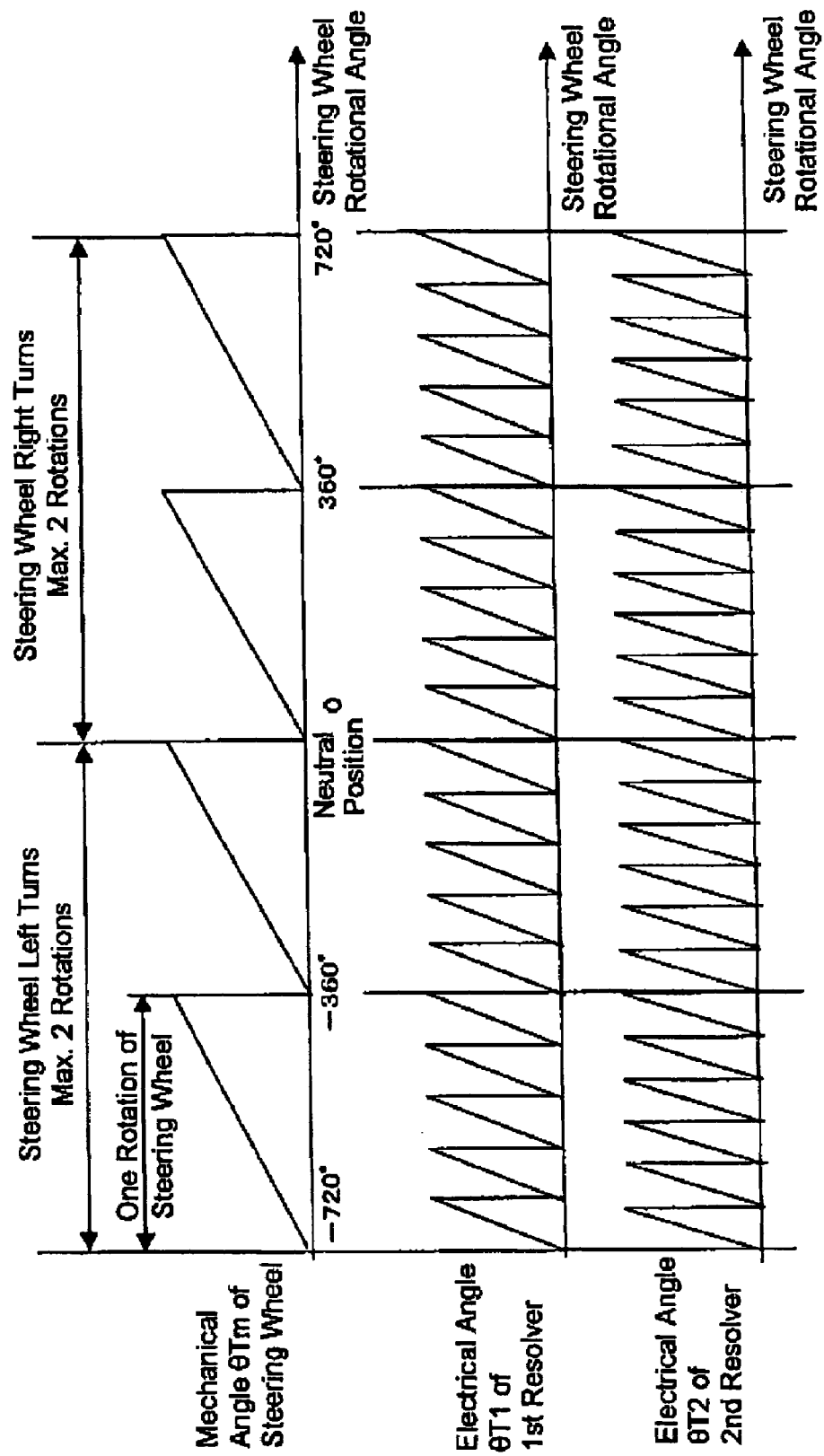
FIG. 6 is a characteristic chart showing resolver signals of first and second resolvers and the mechanical angle of a steering wheel in connection with the rotational angle of the steering wheel.

In this particular embodiment, the resolver output signals obtained from the first resolver 35 in this manner are converted by the CPU 61 into an electrical angle θT1 shown in FIG. 6, and in the same manner, the resolver output signals obtained from the second resolver 37 are converted by the CPU 61 into another electrical angle θT2 shown in FIG. 6.

Herein, it is noted that the electrical angle θT1 obtained from the first resolver 35 has five (5) peak points per rotation (360 degrees) of the steering wheel 21. This is because the first resolver 35 is of the type having five pole pairs each pair of which is composed of one N-pole and one S-pole in the electrical sense, and because it can output electrical angles corresponding to 1800 degrees (360×5) for the 360 degree mechanical angles. In short, the first resolver 35 has a resolution of five (5) times as many as a resolver having a resolution of 360 electrical angles.

Further, it is noted that the electrical angle θT2 obtained from the second resolver 37 has six (6) peak points per rotation (360 degrees) of the steering wheel 21. This is because the second resolver 37 is of the type having six pole pairs each pair of which is composed of one N-pole and one S-pole in the electrical sense, and because it can output electrical angles corresponding to 2160 degrees (360×6) for the 360 degree mechanical angles. In short, the second resolver 37 has a resolution of six (6) times as many as a resolver having a resolution of 360 electrical angles.

As mentioned above, the first resolver 35 outputs the electrical angle θT1 as its resolver signal while the second resolver 37 outputs the electrical angle θT2 as its resolver signal, but as understood from FIG. 6, they do not take the same value even at any angle of the steering wheel 21. Consequently, over one rotation of the steering wheel 21, a mechanical angle θTm of a high resolution can be obtained based on the electrical angle θT1 of the first resolver 35 and the electrical angle θT2 of the second resolver 37 through the operation processing executed by the CPU 61.

Next, description will be made as to the torque detection which is based on the resolver signals output from the first and second resolvers 35, 37.

Figure 4B:
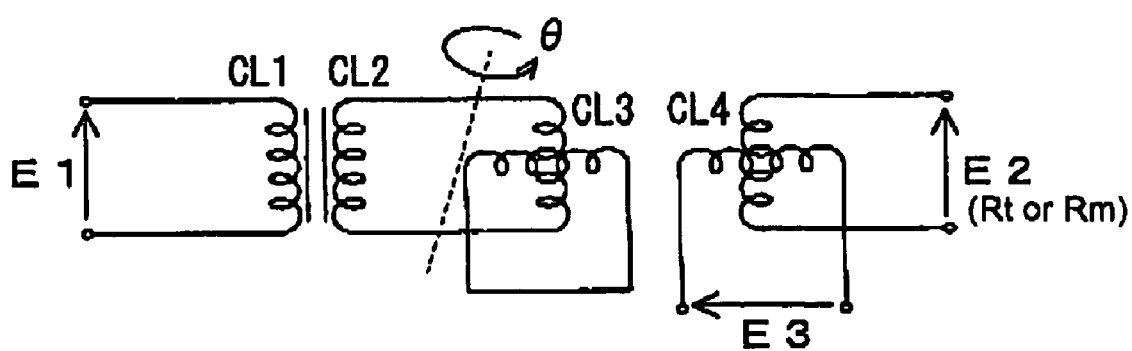
FIG. 4(B) is a circuit chart showing the circuit configuration of each of the resolvers.

When the steering wheel 21 is manipulated by the driver to rotate the input shaft 23a of the pinion shaft 23 through a rotational angle θ1 with an alternate current voltage E1 being applied to the first coil CL1 shown in FIG. 4(B), a magnetic flux is generated around the first yoke YK1 and the second yoke YK2 in dependence upon the applied voltage E1.

Since at this time, an alternate current voltage depending on the change in the magnetic flux is induced in the second coil CL2, an alternate current voltage is also induced in the third coil CL3 connected to the second coil CL2. The alternate current voltage generated in the third coil CL3 causes an alternate current voltage to be induced in the fourth coil CL4, whereby alternate current voltages E2 and E3 are output. At this time, the alternate current voltages E2 and E3 of two kinds which are different in phase from each other are output from the fourth coil CL4 which is composed of coils of two kinds, and these alternate current voltages E2, E3 respectively satisfy relations expressed by the following equations (1) and (2).

$$E2 = K \cdot E1 \times \cos \theta \tag{1}$$

$$E3 = K \cdot E1 \times \sin \theta \tag{2}$$

In the above equations (1) and (2), the symbol "K" represents the voltage transformation ratio.

Therefore, "θ" can be calculated from the above equations (1) and (2). This angle θ represents the rotational angle θ1 of the input shaft 23b of the pinion shaft 23. On the other hand, since the output shaft 23b of the pinion shaft 23 which is connected to the input shaft 23a through the torsion bar 31 is rotated upon rotation of the input shaft 23a, the second resolver 37 provided at the side of the output shaft 23b outputs corresponding signals E2 and E3, based on which the rotational angle θ2 can also be calculated using the above equations (1) and (2).

The torsion bar 31, when given a torsion, brings about the relative rotational difference Δθ(=θ1−θ2) between the input shaft 23a and the output shaft 23b. As a result, the steering torque T can be calculated from the relative rotational difference Δθ indicating the torsion angle of the torsion bar 31 and the torsional rigidity of the torsion bar 31. Accordingly, by executing a known assist control for assisting th steering force in dependence on the calculated steering torque T, the CPU 61 of the ECU 60 is able to control the aforementioned motor 40, so that the steering manipulation of the driver can be assisted with the steering force generated by the motor 40.

Further, detecting the rotational angle of the motor shaft 43 (hereafter as "motor rotational angle") based on a resolver signal output from the motor resolver 44 can also be explained as follows:

When the motor shaft 43 is rotated a certain rotational angle with an alternate current voltage E1 being applied to the first coil CL1 of the motor resolver 44, a magnetic flux is generated around the first yoke YK1 in dependence upon the applied voltage E1, and the generated magnetic flux is conveyed to the second yoke YK2. Since this magnetic flux flows across the second coil YK2 to induce an alternate current voltage, an alternate current voltage is generated also in the third coil CL3 connected to the second coil CL2. The alternate current voltage generated in the third coil CL3 causes an alternate current to be induced in the fourth coil CL4, whereby alternate current voltages E2 and E3 are output. Thus, the motor rotational angle can be calculated by substituting the applied alternate voltage E1 and the output alternate currents E2, E3 into the aforementioned equations (1) and (2). The motor rotational angle detected in this way can be utilized for various controls in the electric power steering device 20.

Subsequently, the processing for detecting the absolute position of the steering wheel 21 in the electric power steering device 20 as constructed above will be described with reference to FIG. 7 through FIG. 11.

As described with reference to FIG. 5, the CPU 61 composing the ECU 60 is electrically connected to each of the first and second resolvers 35, 37 and the motor resolver 44 through the buffer amplifiers 63, 64, 65. And, the first and second resolvers 35, 37 are able to detect the steering angle (electric angles $\theta T1$, $\theta T2$) of the steering wheel 21, while the motor resolver 44 is able to detect the motor rotational angle (electrical angle $\theta Me$) of the motor 40. Thus, in this particular embodiment, processing for detecting the absolute angular position of the steering wheel 21 (hereafter referred to as "absolute position detecting processing") is executed based on the electrical angles $\theta T1$, $\theta T2$, $\theta Me$ which are represented respectively by the resolver output signals output from the three resolvers. It is to be noted that the absolute position detecting processing is executed immediately after an ignition switch is made ON, and in the subsequence to this, a parameter A (A=1, 0, −1, −2) which indicates the range in the rotation of the steering wheels 21 obtained through the absolute position detecting processing is updated at regular time interval (e.g., each five milliseconds) in response to a timer-based interruption or the like.

Figure 7:
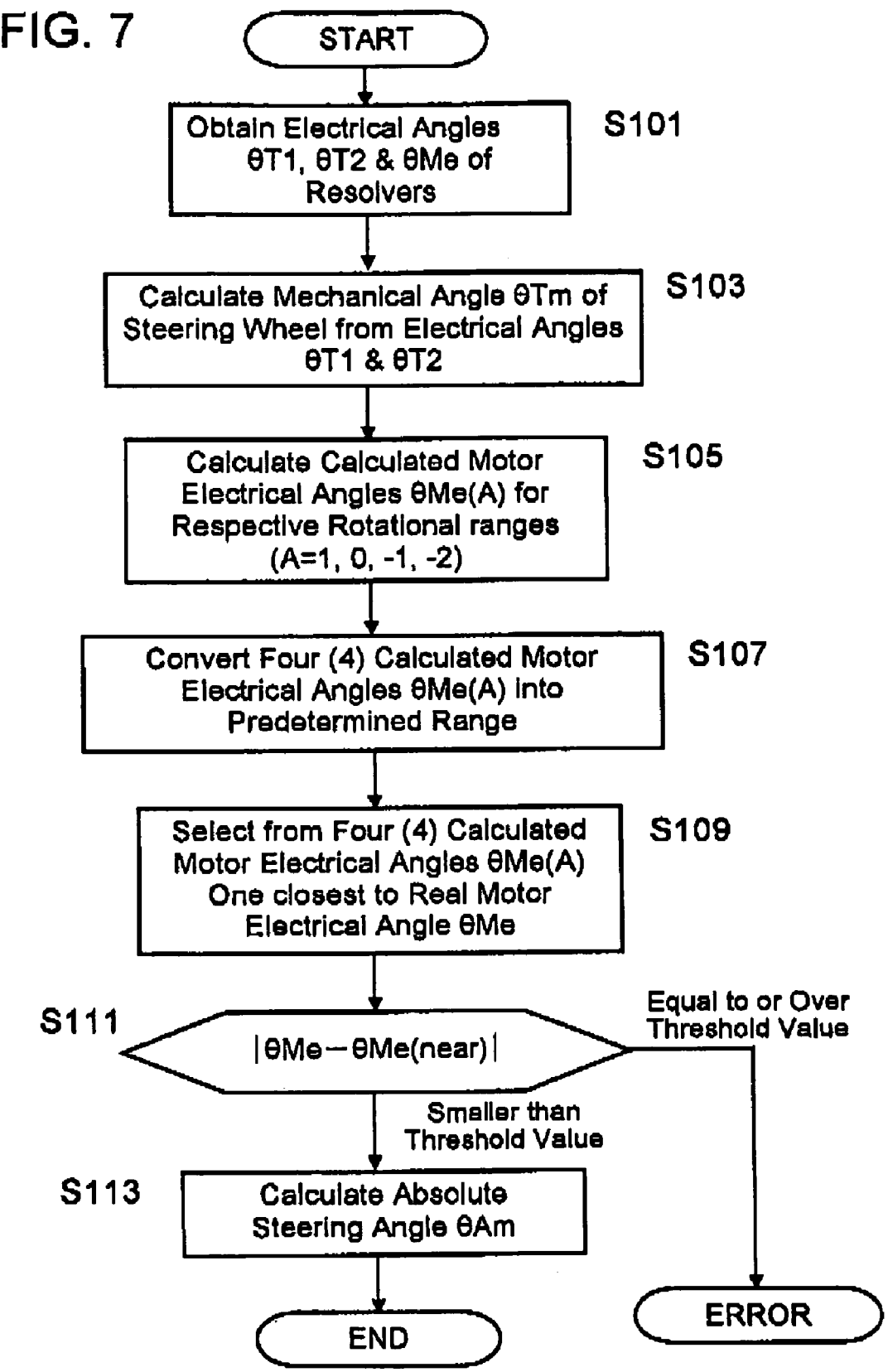
FIG. 7 is a flow chart showing the flow of absolute position detecting processing executed by the CPU shown in FIG. 5.

As shown in FIG. 7, in the absolute position detecting processing, after a predetermined initializing processing, processing for acquiring the electrical angles $\theta T1$, $\theta T2$, $\theta Me$ of the resolvers 35, 37, 44 is executed at Step S101. More specifically, since the electrical angles $\theta T1$, $\theta T2$ which correspond to the steering angle of the steering wheel 21 are output from the first and second resolvers 35, 37, the resolver signals output from the first and second resolvers 35, 37 are acquired through the buffer amplifies 64, 65 and the A-D converters. Simultaneously, the electrical angle $\theta Me$ which corresponds to the motor rotational angle of the motor 40 is detected from the motor resolver 44, and the resolver signal output from the motor resolver 44 is acquired through the buffer amplifies 64, 65 and the A-D converters.

At the next Step S103, processing is executed to calculate the mechanical angle $\theta Tm$ of the steering wheel 21 from the electrical angles $\theta T1$, $\theta T2$. In this particular embodiment, since the first and second resolvers 35, 37 are constructed to be of the five-pair poles and the six-pair poles respectively, the mechanical angle $\theta Tm$ of the steering wheel 21 can be calculated based on the electrical angles $\theta T1$, $\theta T2$ of the two resolvers 35, 37 differing in the number of pole pairs from each other. This operation processing is d scribed in detail in Japanese Patent Application No. 2002-196131 filed by the Assignee of the present application, and hence, reference is to be made to that application for details.

At the next step S105, processing is executed to calculate the electrical angle $\theta Me(A)$ corresponding to each rotational amount (A=1, 0, −1, −2). For example, with respect to the neutral position of the steering wheel 21 as the steering center, one rotational range (0<$\theta$≦360 degrees) to the right is set as A=0, and another successive rotational range (360<$\theta$≦720 degrees) to the right is set as A=1, while with respect to the neutral position as the steering center, one rotational range (0>$\theta$≧−360 degrees) to the left is set as A=−1 and another successive rotational range (−360<$\theta$≦−720 degrees) to the left is set as A=−2. In the case of the rotational ranges being so set, four calculated motor electrical angles $\theta Me(1)$, $\theta Me(0)$, $\theta Me(-1)$, $\theta Me(-2)$ which respectively correspond to A=1, 0, −1, −2 are calculated using the following equation (3). That is, at this Step S105, processing is executed to calculate the calculated motor electrical angle $\theta Me(A)$ for each of the total rotations (in this particular embodiment, for four rotations of the steering wheel 21) of the steering wheel 21.

$$\theta Me(A)=(\theta Tm+360\times A)\times r \quad (3)$$

In this equation, symbol "r" denotes a calculation valve which is the product of the reduction gear ratio of the ball screw mechanism 50 with the number of pole pairs of the motor resolver 44, and as mentioned later, it is the essential requirement that the product is to be a non-integer with a numerical value of the decimal place. In this particular embodiment, since the reduction gear ratio of the ball screw mechanism 50 has been set to 8.2 for example, and the number of pole pairs of the motor resolver 44 has been set to 7 for example, the calculated value becomes 57.4 (=8.2×7), and the numerical value of the decimal place is 0.4.

Further, at Step S107, processing is executed to convert the four calculated motor electrical angles $\theta Me(A)$ into predetermined angular ranges. That is, in order that each of the calculated motor electrical angles $\theta Me(A)$ calculated at Step S105 becomes within an angular range of 0 to 360 degrees, the electrical angles less than 0 degrees are processed to be taken as the absolute values, and the electrical angles larger than 360 degrees are processed under the calculation of "$\theta Me(A)-INT(\theta Me(A)/360)\times 360$". The symbol "INT( )" in this calculation stands for a function for converting the quotient within the parenthesis into an integer.

For example, the conversion processing is executed in such a way that where the calculated motor electrical angle $\theta Me(-2)$ is −80 degrees, it is converted into +80 degrees (=|−80 degrees|), where the calculated motor electrical angle $\theta Me(1)$ is 380 degrees, it is converted into 20 degrees (=380−1×360 degrees) and where the calculated motor electrical angle $\theta Me(2)$ is −400 degrees, it is converted into 40 degrees (=|−400−(−360)|).

At successive Step S109, processing is executed to select from the four calculated motor electrical angles $\theta Me(A)$ one which is closest in value to an actual motor electrical angle $\theta Me$ (hereafter referred to as "real motor electric angle $\theta Me$" to be distinguished from the calculated motor electrical angles $\theta Me(A)$). That is, as mentioned later, of the four calculated motor electrical angles $\theta Me(A)$ which have been obtained for the total rotations of the steering wheel 21 at Steps S105 and S109, one of them is the calculated motor electrical angle $\theta Me(near)$ that properly represents the absolute position of the steering wheel 21, and therefore, the processing for selecting such one calculated motor electrical angle $\theta Me(A)$ is executed at this step S109.

The processing at this Step 109 may be modified to the processing for selecting one closest to an integer, from all the calculated motor electrical angles $\theta Me(A)$ calculated through Steps S106 and S109. In this particular embodiment, however, the processing for selecting one closest to the real motor electrical angle $\theta Me$ detected by the motor resolver 44 is executed at this Step S109. This can be done by calculating the differences between the real motor electrical angle $\theta Me$ acquired at Step S101 and all the calculated motor electrical angles θMe(A) and then, by selecting as the calculated motor electrical angle θMe(near) one corresponding to the smallest difference. In this way of selection, the algorithm for realizing the processing at Step S109 can be simplified compared to the processing for selecting one closest to an integer.

At step S111, processing is performed to judge whether or not, the calculated motor electrical angle θMe(near) which has been selected through Step S109 is really appropriate. More specifically, the calculated motor electrical angle θMe (near) has been selected at Step S109 as one which is closest to the real motor electrical angle θMe detected by the motor resolver 44. However, in the event that the difference between the calculated motor electrical angle θMe(near) and the real motor electrical angle θMe exceeds a predetermined threshold value (e.g., 10 degrees), such a high probability can be anticipated that there has arisen an error exceeding a predetermined tolerance. Such an error may be due to any one or some of the defects in dimensional accuracy of mechanical components which constitute the pinion shaft 23, the rack shaft 24, the ball screw mechanism 50 or the like, due to the abrasion or the like of the mechanical components, or due to the deterioration in temperature characteristic of semiconductor electronic components such as, for example, operational amplifiers for processing the resolver signals, or the like. In such an event, the occurrence of the abnormality is alerted and a series of the absolute position detecting processing is terminated for the reason of the error.

(ERROR)

On the contrary, the difference between the calculated motor electrical angle θMe(near) and the actual motor electrical angle θMe is smaller than the predetermined threshold value, it is judged that no error is found in the mechanical components which constitute the pinion shaft 23, the rack shaft 24, the ball screw mechanism 50 or the like or the semiconductor electronic components such as, for example, operational amplifiers for processing the resolver signals, or the like. Thus, the routine proceeds to the next Step S113, wherein processing is executed to calculate an absolute steering angle θAm. That is, in this Step 113, the parameter A indicative of the calculated motor electrical angle θMe selected at Step S109 (the index A in this particular embodiment is any of 0, 1, −1 and −2) is substituted into the following equation (4) to execute processing based on the mechanical angle θTm of the steering wheel 21 which has been calculated at Step S103. As a consequence, the absolute steering angle θAm of the steering wheel 21 can be detected, so that the series of the absolute position detecting processing is terminated normally.

$$\theta Am = \theta Tm + 360 \times A \quad (4)$$

By observing the mechanical angle θTm which is obtained from the outputs of the first and second resolvers 35, 37, at a regular time interval (e.g., every 5 milliseconds), the parameter A obtained in this way can be updated or renewed. Accordingly, after the execution of the absolute position detecting processing, the absolute steering angle θAm can be calculated by the use of the equation noted above.

That is, updating the parameter A is executed using the following equations (4)' and (4)". First of all, a judgment is made as to whether or not, the angle which is obtained by subtracting the preceding mechanical angle θTm-old from the present mechanical angle θTm of the steering wheel 21 exceeds 180 degrees, namely whether or not, the equation (4)' below is satisfied. If the equation (4)' below is satisfied, it is meant that the steering wheel 21 has been rotated more than one rotation in the left turn. Thus, the parameter A is decremented to renew like A=A−1, and the present mechanical angle θTm is stored as the preceding mechanical angle θTm-old.

If the equation (4)' below is not satisfied, on the contrary, a judgment is made of whether or not, the angle which is obtained by subtracting the preceding mechanical angle θTm-old from the present mechanical angle θTm of the steering wheel 21 is smaller than 180 degrees, namely whether or not, the equation (4)" below is satisfied. If the equation (4)" below is satisfied, it is meant that the steering wheel 21 has been rotated more than one rotation in the right turn. Thus, the parameter A is incremented to renew like A=A+1, and the present mechanical angle θTm is stored as the preceding mechanical angle θTm-old. Further, if any of the equations (4)' and (4)" is not satisfied, it is meant that the steering wheel 21 is being rotated within one rotation in the left or right turn. Thus, it is unnecessary to renew the parameter A and the preceding mechanical angle θTm-old, and the present value of the parameter A and the preceding mechanical angle θTm-old are kept as they are.

$$\theta Tm - \theta Tm\text{-old} > 180 \text{ degrees} \quad (4)'$$

$$\theta Tm - \theta Tm\text{-old} < -180 \text{ degrees} \quad (4)''$$

In accordance with this algorithm, the parameter A can be updated appropriately, so that after the execution of the aforementioned absolute position detection processing, the absolute steering angle θAm can be calculated using the equation (4) above.

Herein, explanation will be made as to the reason why the calculated value (r) of the aforementioned equation (3) used at Step 5105 is accompanied by an essential requirement that it should be a non-integer having a numerical value of the decimal place.

In the Japanese patent application No. 2002-196131, the Assignee of the present application has represented a steering angle detected by the torque sensor 30 as symbol θt (corresponding to the aforementioned mechanical angle θTm), an electrical angle of the motor rotational angle as symbol θm (corresponding to the aforementioned real motor electrical angle θMe), the absolute position Pt of the steering wheel 21 detected by a torque sensor as an equation (5) below, and the absolute position Pm of the steering wheel 21 detected from the motor rotational angle as an equation (6) below. It is noted that the calculated value (r) is the product of the reduction gear ratio of the ball screw-mechanism 50 with the number of pole pairs in the motor resolver 44.

$$Pt = \theta t + 360 \cdot A \quad (5)$$

$$Pm = (\theta m + 360 \cdot B)/r \quad (6)$$

In the equation (5), the parameter A is an integer taking one of −2, −1, 0, 1. In the equation (6), the parameter B becomes an integer within the range of −126 through 125 in the case that theoretically, there does not arise any error which is caused by the shaking or jolting in the mechanical system connecting the steering wheel 21 with the motor 40 or by the error in the absolute accuracy of the electrical angle of the first and second resolvers 35, 37 constituting the torque sensor 30 or of the motor resolver 44 of the motor 40.

Since each of the equations (5) and (6) above represents the absolute position of the steering wheel 21 and since the both equations (5) and (6) are equal to each other, an equation (7) below holds true, from which an equation (8) below is derived.

$$\theta t + 360 \cdot A = (\theta m + 360 \cdot B)/r \quad (7)$$

$$B = (r \cdot (\theta t + 360 \cdot A) - \theta m)/360 \quad (8)$$

In the aforementioned, Japanese patent application filed by the Assignee of this application, the calculated value (r) in the equations (5) through (8) above has been represented as being replaced as 57.4. This is because where the rack shaft 24 is moved S millimeters by one rotation of the steering wheel 21 and where the lead of the ball screw mechanism 50 is L, the motor shaft 43 is rotated through S/L by the S millimeter movement of the rack shaft 24, and this motion conversion is set to correspond to 8.2 in the-reduction gear ration of the ball screw mechanism 50. The reason above is also because where the time interval Tm1 at which the resolver 44 outputs its detection signal θm is set as 7 cycles which corresponds to the number of the pole pairs of the motor resolver 44, the time interval Tm2 at which the motor resolver 44 outputs its detection signal θm for one rotation of the steering shaft 21 (or the pinion shaft 23), in other words, the product which is obtained by multiplying the reduction gear ratio of the ball screw mechanism 50 with the number of the poles pairs of the motor resolver 44 becomes 57.4 (=Tm1×(S/L)=7×8.2).

As mentioned earlier, the parameter B is the value which is given theoretically as an integer. Actually, however, there are involved some errors due to the shaking in the mechanical system connecting the steering wheel 21 with the motor 40, or due to errors in absolute accuracy of the electrical angles which are detected by the first and second resolvers 35, 37 of the torque sensor 30 and the motor resolver 44 of the motor 40. Therefore, realistically, since the parameter B includes a value of the decimal place and since four kinds of the B-parameters can be obtained from the equation (8) above in dependence on the values of the parameter A (i.e., −2, −1, 0, 1), a case may occur that in selecting one appropriate value (i.e., true value) as the absolute position of the steering wheel 21, such one appropriate value is confused with other three values (i.e., false values).

That is, in the device described in the aforementioned Japanese patent application No. 2002-196131, the processing is executed to select the parameter B which of all the B-parameters, is closest to an integer. Thus, where an error is involved due to, e.g., the shaking in the mechanical system as mentioned earlier, any of the three other values (i.e., false values) may erroneously be selected when the appropriate value (i.e., true value) is to be selected. This apprehension was found through the research of the inventor of the present application.

Figure 8A:
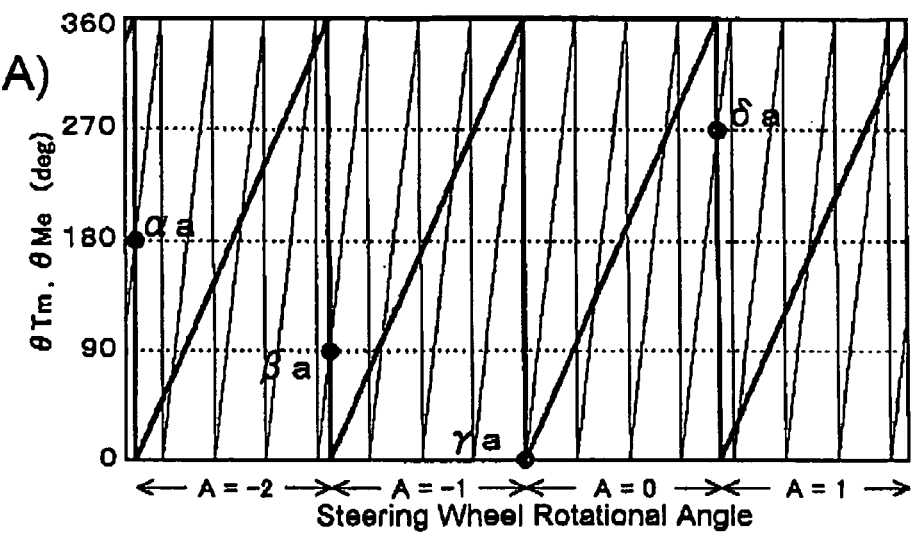
FIG. 8(A) is a characteristic graph showing the variations of the mechanical angle $\theta Tm$ of a steering wheel and the electrical angle $\theta Me$ of an electric motor in connection with the rotational amount of the steering wheel in the case of a calculated value being (r)=3.75.
Figure 8B:
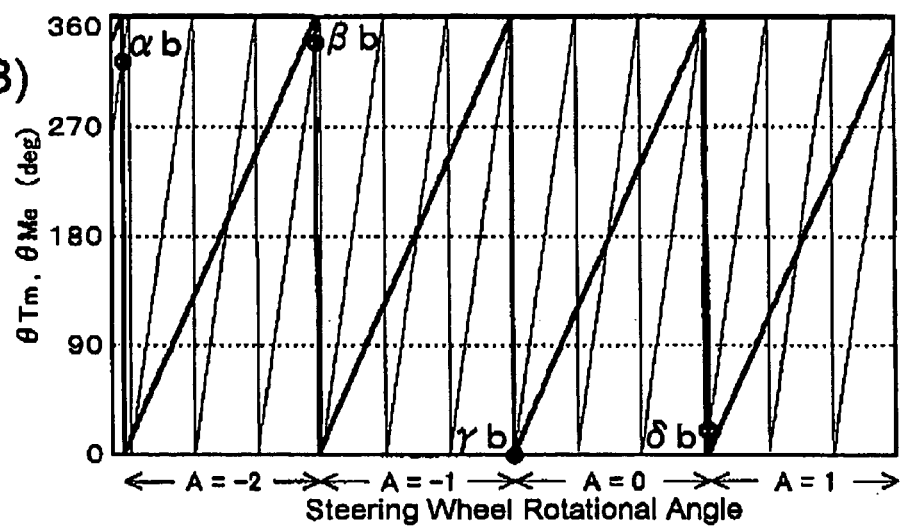
FIG. 8(B) is another characteristic graph similar to FIG. 8(A) in the case of the calculated value being (r)=3.05.
Figure 8C:
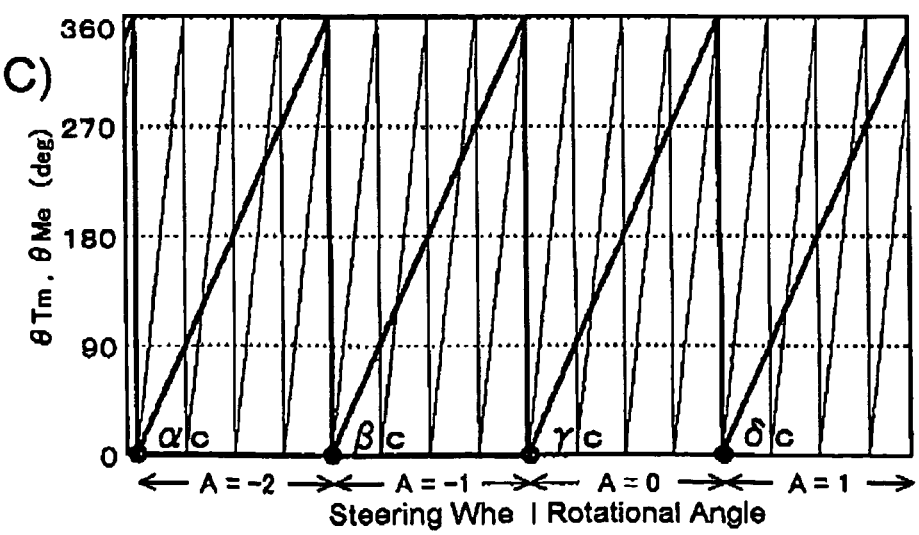
FIG. 8(C) is still another characteristic graph similar to FIG. 8(A) in th case of the calculated value being (r)=4.00.

For example, FIG. 8(A) to 8(C) are characteristic charts each showing the variations of the mechanical angle θTm (Thick line) of the steering wheel 21 and the real motor electrical angles θMe (Fine line) detected by the motor resolver 44 in relation to the rotational amounts (A=−2, −1, 0, 1) of the steering wheel 21. FIG. 8(A) shows the characteristic in the case of the calculated value being set as r=3.75, FIG. 8(B) shows that in the case of the calculated value being set as r=3.05, and FIG. 8(C) shows that in the case of the calculated value being set as r=4.00. The calculated value (r) is the product of the reduction gear ratio of the ball screw mechanism 50 with the number of pole pairs in the motor resolver 44.

As shown in FIG. 8(A), in the case that the numerical value of the decimal place is set to 0.75 (e.g., r=3.75), for example, when the value γa which corresponds to the neutral position of the steering wheel 21 is a true value, three other values αa, βa, δa take respective values which are different 90 degrees from one another as well as from the true value γa. That is, FIG. 8(A) demonstrates that even in the presence of errors due to the shaking of the mechanical system or the like, the true value γa has a room of 90 degrees from any of the adjoining values, so that there is little chance to cause the true value γa to be confused with the false values αa, βa, δa.

Also, as shown in FIG. 8(B), in the case that the numerical value of the decimal place is set to 0.05 (e.g., r=3.05), when the value γb which corresponds to the neutral position of the steering wheel 21 is a true value, this true value γb has only the difference of about 10 degrees from the false values αb, βb, δb. That is, FIG. 8(B) demonstrates that since the true value γb has only a small room of about 10 degrees from the adjoining values, there is some chance for the true value γb to be confused with the false values αb, βb, δb in dependence upon the magnitude of the error due to, e.g., the shaking of the mechanical system.

On the other hand, as shown in FIG. 8(C), in the case that the numerical value of the decimal place is set to 0 (zero) (e.g., r=4.00), when the value γc which corresponds to the neutral position of the steering wheel 21 is a true value, other false values αc, βc, δc take the same value as the true value γc (there is no room), so that the true value γa cannot be distinguished from other false values αc, βc, δc. That is, FIG. 8(C) demonstrates that it is impossible to distinguish the true value γc from other false values αc, βc, δc.

As described above, it can be understood from FIGS. 8(A), 8(B), B(C) that the value (r) which is the product of the reduction gear ratio of the ball screw mechanism 50 with the number of pole pairs in the motor resolver 44 substantially has a large influence on selecting the true value from the plural calculated motor electrical angles θMe(A) without confusing with the false values at the aforementioned Step S109. It can also be understood from the figures that in particular, the true value cannot be identified where the value of the calculated value (r) is an integer. This is the ground that it is the essential requirement as mentioned earlier that the calculated value (r) in the equation (3) above with which a calculation processing is executed at Step S105 should be a non-integer having a numerical value of the decimal place.

Figure 9:
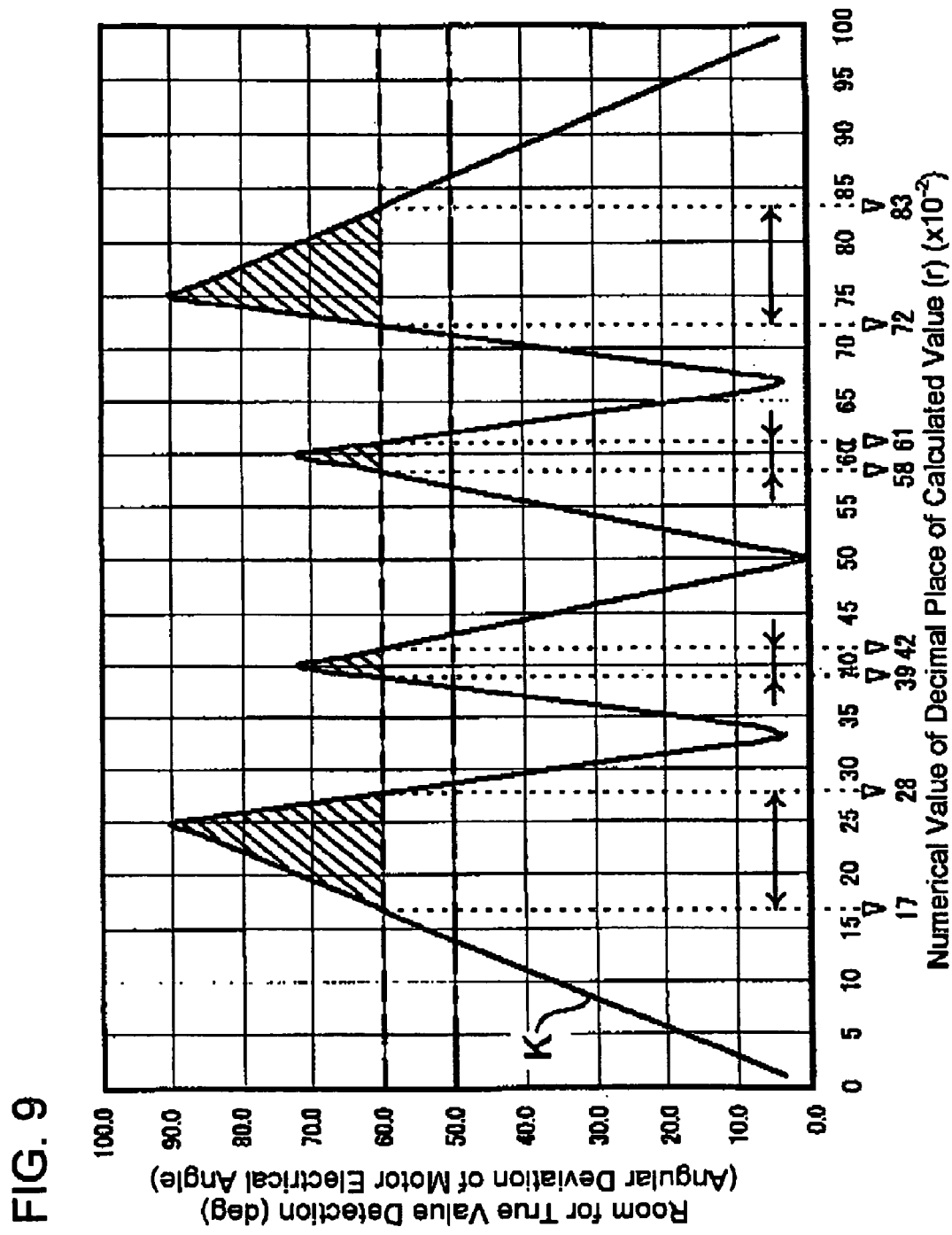
FIG. 9 is a characteristic graph (zigzag line K) showing the variation of a room for true-value detection in connection with a numerical value of the decimal place of the calculated value (r)

Next, the influence that such room is given by the errors due to the shaking in the mechanical system constituting the electric power steering device 20 will be described with reference to FIGS. 8(A), 8(B), 8(C) and FIG. 9. FIG. 9 is a characteristic chart which shows the variation of the room for the true value detection in connection with numerical values of the decimal place of the calculated value (r). The grounds of this characteristic chart will be described later.

Herein, the expression "the room for the true value detection" means an index or the like that represents as an absolute value (0≦the smallest deviation<180 degrees) the difference between the true value and a false value closest to the true value which are selected from among the calculated motor electrical angles θMe(A) of four kinds (A=−2, −1, 0, 1) calculated as mentioned earlier. For example, in the instance shown in FIG. 8(B), the difference between the true value γb and the false value δb closest to the true value γb is 20 degrees for example. The room for the true value detection corresponds to "angular deviation from the motor electrical angle" defined in the patent claims.

For example, assuming now that in this particular embodiment, the error due to the shaking of the mechanical system is ±0.24 degrees and that the detection accuracy of the torque sensor 30 is ±0.16 degrees, the error of the mechanical angle θTm of the steering wheel 21 which are calculated from the electrical angles θT1, θT2 as mentioned previously becomes 0.4 degrees as the sum thereof.

Herein, since the motor electrical angle θMe(A) is calculated by the equation (3) above, the calculated motor electrical angle θMe(0) in the case of A=0, θTm=0 and r=60.67 for example is calculated by replacing θTm with θTm=(0+0.4) including the error 0.4 of the θTm and then, by substituting θTm=(0+0.4) into the equation (3) and becomes ((0+0.4)+360×0)×60.76=24.3 degrees). That is, the error 0.4 is multiplied with (r) (in this example, multiplied with 60.76) to be reflected on the calculated motor electrical angles θMe(A). Such error is anticipated to be involved in the true value as well as in the false values adjoining thereto and hence, when calculated under such anticipation, is to be mad twice. Thus, the error becomes 48.6 degrees which the twice of the 24.3 degrees.

Accordingly, as having been described with reference to FIG. 8(A), even when the true value has a room of 90 degrees from the value adjoining thereto, the error due to the shaking of the mechanical system gives the calculated motor electrical angle θMe(A) an error of almost 50 degrees (≈48.6 degrees), whereby it results that the room is restrained to 40 degrees (=90−50). Where such error zone is represented as shown in FIG. 9, the boundary of the error zone can be specified by drawing a one-dot chain line along the line of the 50-room for the true value detection.

Further, as having been described with reference to FIG. 7, in this particular embodiment, it is judged at Step S111 for the absolute position detecting processing whether or not, the difference between the calculated motor electrical angle θMe(near) and the real motor electrical angle θMe exceeds the predetermined threshold value (e.g., 10 degrees), and if it exceeds the predetermined threshold value, the routine under processing is terminated for the reason of abnormality (ERROR). In this connection, the added value of 60 degrees which is made by adding the predetermined threshold value (e.g., 10 degrees) to the error zone boundary (i.e., 50 degrees) can be set as a lower limit value for the angular deviation from the calculated motor electrical angle θMe (A). A room (i.e., 60 degrees) for the true value detection calculated in this manner is also shown as a broken line in FIG. 9.

That is, where as shown in FIG. 9, the numerical value of the decimal place of the calculated value (r) is set to reside in the zone (the oblique line zone in FIG. 9) within which the room for the true value detection is not smaller than 60.0 degrees and not larger than 90.0 degrees (i.e., 60.0 through 90.0 degrees), the true value can be selected from the plural calculated motor electrical angles θMe(A) without being confused with other false values at the foregoing Step S109 even in the presence of the error due to the shaking in the mechanical system constituting the electric power steering device 20.

In the concrete, since the room of 60 degrees for the true value detection corresponds to 67 percents (=60/90) of 90 degrees which is the largest value of the zigzag line K shown in FIG. 9, the room of 60.0 to 90 degrees for the true value detection corresponds to 67% or more and 100% or less of the zigzag line K which represents the variation of the room for the true value detection in relation to the variation in the numerical value of the decimal place of the calculated value (r). And, the numerical value of the decimal place of the calculated value (r) within this zone are within one of ranges "from 0.17 to 0.28", "from 0.39 to 0.42", "from 0.58 to 0.61" and "from 0.72 to 0.83", as extracted from FIG. 9. Where the calculated value (r) having any of these values has been set, it is possible to select the true value from the plural calculated motor electrical angles θMe(A) without being confused with other false values. It is to be noted that the ranges "from 0.17 to 0.28", "from 0.39 to 0.42", "from 0.58 to 0.61" and "from 0.72 to 0.83" are numerical ranges of the decimal place which cause those angular deviations corresponding in value to 67% to 100% of the largest one of angular deviations from the motor electrical angles which deviations are different for the respective rotational range units including at lest one left rotation and one right rotation of the steering wheel.

Furthermore, where the room for the true value detection is set to 90 degrees which is 100% of the upper limit of the error zone (oblique line zone), it becomes the largest. That is, as understood in FIG. 8(A), since the steering wheel 21 is rotated through four rotations as the parameter A varies like A=−2, −1, 0, 1, the 90-degrees obtained by dividing 360 degrees by 4 (=360/4) corresponds to the mid position between the false values βa, δa which are angularly positioned respectively at opposite sides of the true value γa, so that the room for the true value detection becomes the largest. Therefore, the upper limit of the error zone is set to 90 degrees.

Figure 10A:
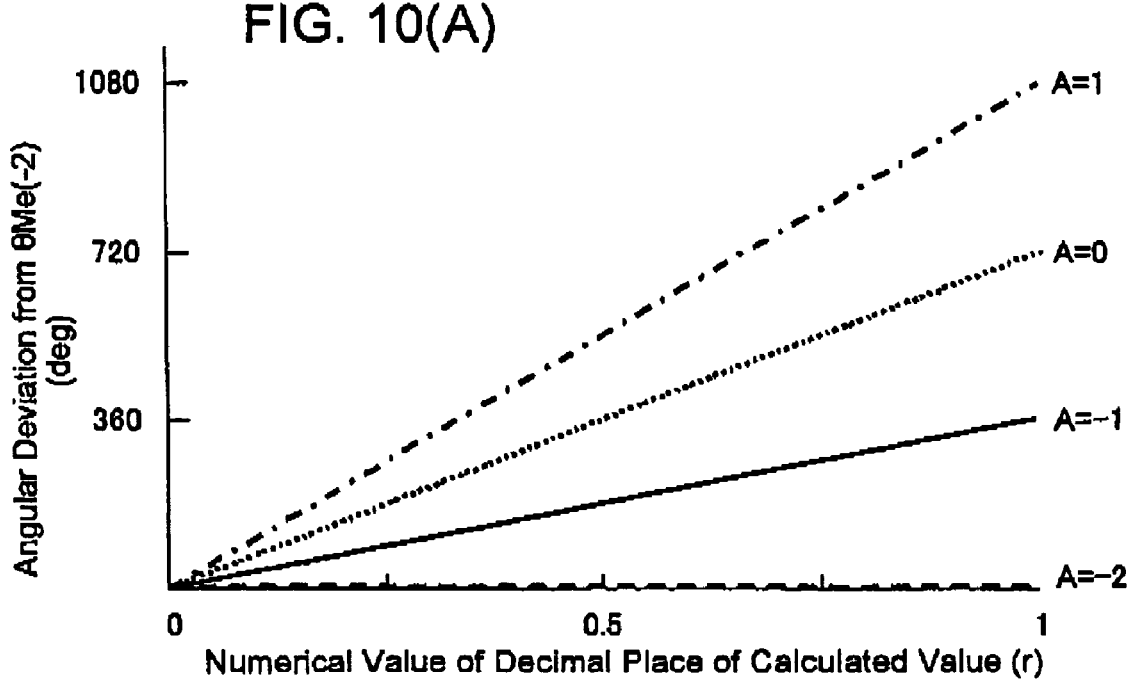
FIG. 10(A) is a characteristic graph showing the deviations from calculated motor electrical angles $\theta Me(-2)$ in connection with the variation in a numerical value of the decimal place of the calculated value (r)

Next, the grounds for the characteristic chart (zigzag line K) representing the variation of the room for the true value detection in relation to the numerical values of the decimal place of the calculated value (r) will be described with reference to FIGS. 10(A), 10(B), 11(A), and 11(B). FIG. 10(A) shows the characteristic representing the variation of the deviations from the calculated motor electrical angle θMe(−2) in relation to the numerical values of the decimal place of the calculated value (r).

As having been described with reference to FIG. 8(C), where the numerical value of the decimal place of the calculated value (r) is set to 0 (zero), the calculated motor electrical angle θMe(A) takes the same value for any of the four-kind rotational amounts (A=−2, −1, 0, 1) of the steering wheel 21, and therefore, it is unable to distinguish the true value from the false values. That is, in FIG. 10(A), where the numerical value of the decimal place of the calculated value (r) is set to 0 (zero), since the deviation from the broken line for A=−2 becomes zero, each of the solid line for A=−1, the dotted line for A=0 and the one-dot chain line for A=1 takes 0 (zero) value.

Figure 10B:
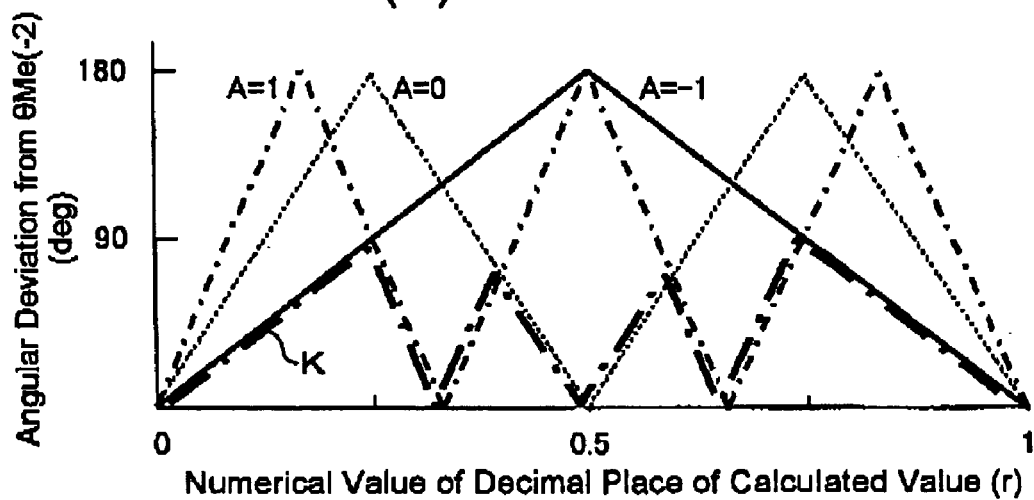
FIG. 10(B) is a similar characteristic graph (zigzag line K) wherein the deviations shown in FIG. 10(A) are represented as being turned back each time of reaching the deviation of 180-degrees.

On the contrary, as the numerical value of the decimal place is increased gradually, any of the solid line for A=−1 the dotted line for A=0 and the one-dot chain line for A=1 increases the deviation from the broken line for A=−2. In this case, the positive inclination amount is enlarged in the sequence or order of the solid line for A=−1, the dotted line for A=0 and the one-dot chain line for A=1. This is because the product of the parameter A with 360 is further multiplied by the calculated value (r), as understood from the equation (3) above. Therefore, taking the broken line for A=−2 as the base, as understood from FIG. 10(A), the solid line for A=−1 varies from 0 to 360 degrees, the dotted line for A=0 varies from 0 to 720 degrees which is twice as much as the solid line for A=−1. And, the one-dot chain line for A=1 varies 0 to 1080 degrees which is three times as much as the solid line for A=−1.

Where the deviations of the calculated motor electrical angle θMe(A) from the base of the broken line for A=−2 are calculated in the respective cases of A=−1, A=0 and A=1 as the numerical value of the decimal place of the calculated value (r) is varied from 0 to 1, it would be understood that a relationship shown in FIG. 10(A) exists among them. And, where the respective deviations so calculated are represented as being turned back each time of reaching 180 degrees, there can be obtained a characteristic chart of a chevron shape as shown in FIG. 10(B). The broken line for A=−2 is omitted in FIG. 10(B).

More specifically, while the solid line for A=−1 increases linearly from 0 to 360 degrees in FIG. 10(A), it turns back each time of reaching 180 degrees in FIG. 10(B). Thus, the solid line for A=−1 in FIG. 10(B) turns back each time the numerical value of the decimal place of the calculated value (r) reaches 0.5, thereby to decrease linearly with a negative inclination and thus, forms a zigzag line (solid line) drawing an isosceles triangle.

And, while the dotted line for A=0 increases linearly from 0 to 720 degrees in FIG. 10(A), it turns back each time of reaching 180 degrees and 0 degree in FIG. 10(B). Thus, the dotted line for A=0 in FIG. 10(B) turns back each time the numerical value of the decimal place of the calculated value (r) reaches 0.25, 0.5 and 0.75, thereby to repeat increase and decrease twice and thus, forms a zigzag line (dotted line) drawing two isosceles triangles.

Further, while the one-dot chain line for A=1 increases linearly from 0 to 1080 degrees in FIG. 10(A), it turns back each time of reaching 180 degrees and 0 degrees in FIG. 10(B). Thus, the one-dot chain line for A=1 in FIG. 10(B) turns back each time the numerical value of the decimal place of the calculated value (r) reaches 0.167, 0.333, 0,5, 0.667 and 0.833 thereby to repeat increase and decrease three times and thus, forms a zigzag line (one-dot chain line) drawing three isosceles triangles.

Further, where the calculated motor electrical angle θMe (−2) in the case of A=−2 is assumed as the true value, each of the zigzag lines represented above shows that as the deviation from the broken line for A=−2 comes close to 0 (zero), the confusion tends to arise between the calculated motor electrical angle θM (−2) as the true value and the calculated motor electrical angles θMe(−1), θMe(0) and θMe(1) respectively as other false values. Therefore, where the false values each of which is closest to the electrical angle θMe(−2) as the true value at each of the numerical values of the decimal place are selected from the zigzag lines, the zigzag line K (represented by the thick line in FIG. 10(B) can be generated. That is, this zigzag line K is the characteristic (zigzag line K), as described with reference to FIG. 9, which represents the variation in the room for the true value detection in relation to the numerical values of the decimal place of the calculated value (r).

In FIGS. 10(A) and 10(B), the deviations of the calculated motor electrical angles θMe(A) from the broken line for A=−2 taken as the base are calculated in the respective cases of A=−1, A=0 and A=1 as the numerical value of the decimal place of the calculated value (r) is varied from 0 to 1. However, where the deviations of the calculated motor electrical angles θMe(A) from the solid line for A=−1 taken as the base are calculated in the respective cases of A=−2, A=0 and A=1, they are represented as shown in FIG. 11(A). And, where the deviations represented in a FIG. 11(A) are represented as being turned back each time of reaching 180 degrees, there can be obtained another characteristic chart of a chevron shape as shown in FIG. 11(B). Then, on the assumption that takes as the true value the calculated motor electrical angle θMe(−1) in the case of A=−1, where the false values each of which is closest to the electrical angle θMe(−1) as the true value at each of numerical values of the decimal place are selected from the zigzag lines, another zigzag line L (represented by the thick one-dot chain line in FIG. 11(B) can be generated. The solid line for A=−1 is omitted in FIG. 11(B).

Further, where the deviations of the calculated motor electrical angles θMe(A) from the dotted line for A=0 taken as the base are calculated in the respective cases of A=−2, A=−1 and A=1, the deviations in the cases of A=−1 and A=1 from the dotted line for A=0 taken as the base are same, and the deviation in the case of A=−2 is larger than the deviations in the cases of A=−1 and A=1. Therefore, the deviations of the calculated motor electrical angles θMe(A) from the dotted line for A=0 taken as the base can be represented like the case that the broken line for A=−1 is set as the base as shown in FIGS. 11(A) and 11(B).

Further, where the deviations of the calculated motor electrical angles θMe(A) from the one-dot chain line for A=1 taken as the base are calculated in the respective cases of A=−2, A=−1 and A=0, the deviations are shifted in the order of the cases A=0, A=−1 and A=−2. Thus, the deviations from the broke line for A=1 can be represented like the case that the broken line for A=−2 is taken as the base as shown in FIGS. 10(A) and 10(B).

Furthermore, where the characteristic chart in FIG. 10(B) is compared with that in FIG. 11(B), the characteristic of an isosceles triangle which has a peak (the maximum value) at the calculated value (r)=0.5 in the case of A=−1 shown in FIG. 10(B) is the same as the characteristic of an isosceles triangle which has a peak (the maximum value) at the calculated value (r)=0.5 in the cases of A=0 and A=−2 shown in FIG. 11(B). Similarly, the characteristics of two isosceles triangles which have peaks (the maximum values) at the calculated values (r)=0.25 and (r)=0.75 in the case of A=0 shown in FIG. 10(B) are the same as the characteristics of two isosceles triangles which have a peak (the maximum value) at the calculated value (r)=0.25 in the case of A=1 and another peak (the maximum value) at the calculated value (r)=0.75 in the case of A=0 shown in FIG. 11(B).

Thus, with respect to the zigzag line L (FIG. 11(B)) which is obtained by calculating the deviations of the calculated motor electrical angles θMe(A) in the respective cases A=−2, A=0 and A=−1 from the broken line in the case of A=−1 and with respect to the zigzag line L (FIG. 11(B)) which is obtained by calculating the deviations of the calculated motor electrical angles θMe(A) in the respective cases A=−2, A=−1 and A=1 from the dotted line in the case of A=0, the zone (e.g., 60 to 120 degrees) around the largest value (about 120 degrees) comes to be included within the zone (i.e., oblique line zone) of 60.0 to 90 degrees shown by the zigzag line K in FIG. 9. Thus, also in the cases of the broken line for A=−2 and for A=0 being taken as the base, the zone (e.g., oblique line zone) of 60.0 to 90.0 degrees on the zigzag line K shown in FIG. 9 can be applied as it is.

As described hereinabove, in the electric power steering device 20 according to the present embodiment, the reduction gear ratio of the ball screw mechanism 50 is set so that the calculated value (r) which is the product of the reduction gear ratio with the number of pole pairs of the motor resolver 44 becomes a non-integer having a numerical value of the decimal place. Thus, it does not take place that the calculated value (r) has a zero value as the numerical value less that the decimal point or does not become an integer. Thus, the mechanical angle θTm of the steering wheel 21 which can be calculated based on the electrical angle θT1 of the first resolver 35 and the electrical angle θT2 of the second resolver 37 is made not to take the same value in the rotational range unit (A=−2, −1, 0, 1) of any rotation of the total 4 rotations including two rotations to the left and two rotations to the right, of the steering wheel 21. As a result, the absolute position θAm of the steering wheel 21 can be precisely detected at Step S109 for the absolute position detecting processing executed by the CPU 61 of the ECU 60. Accordingly, the motor 40 for assisting the steering manipulation can be controlled by the ECU 60 in dependence on the absolute steering angle θAm of the steering wheel 21 which is detected in the manner mentioned above.

In a modified form of the embodiment, the number of pole pairs of the motor resolver 44 may be set so that the calculated value (r) which is the product of the reduction gear ratio with the number of pole pairs of the motor resolver 44 becomes a non-integer having a numerical value of the decimal place. If so setting is made, the mechanical angle θTm of the steering wheel 21 which can be calculated based on the electrical angle θT1 of the first resolver 35 and the electrical angle θT2 of the second resolver 37 is made not to take the same value in the rotational range unit (A=−2, −1, 0, 1) of any rotation of the total 4 rotations including two rotations to the left and two rotations to the right, of the steering wheel 21. Thus, the absolute position θAm of the steering wheel 21 can be precisely detected at Step S109 for the absolute position detecting processing executed by the CPU 61 of the ECU 60. Accordingly, like the case that the reduction gear ratio of the ball screw mechanism 50 is so set, the motor 40 for assisting the steering manipulation can be controlled by the ECU 60 in dependence on the absolute steering angle θAm of the steering wheel 21.

Also, in the electric power steering device 20 according to the present embodiment, the numerical value of the decimal place of the calculated value (r) is within a predetermined range, and the predetermined range is set to a range of 67% to 100% of the maximum value of the deviations from the calculated motor electrical angle θMe(−2) which are different respectively for the rotational ranges (A=−2, −1, 0, 1) in the four rotations in total including two left rotations and two right rotations of the steering wheel 21. Thus, even where a detection error arises on the mechanical angle θTm of the steering wheel 21 due to the defects in dimensional accuracy of the mechanical components which constitute the pinion shaft 23, the rack shaft 24, the ball screw mechanism 50 or the like, due to the abrasion of the mechanical components or due to the deterioration in temperature characteristic of the electronic components for processing the resolver signals or the like, it can be realized that a rotational range unit and another rotational range unit (in the example shown in FIG. 10 for example, between rotational range A=−2 and rotational range A=−1, between rotational range A=−1 and rotational range A=0, and between rotational range A=0 and rotational range A=−1) do not take the same value. Accordingly, even where such error occurs, the absolute steering angle θAm of the steering wheel 21 can be detected precisely, so that the ECU 60 is able to control the motor 40 for assisting the steering manipulation, based on the absolute steering angle θAm of the steering wheel 21 so precisely detected.

Further, in the electric power steering device 20 and the apparatus and method for manufacturing the electric power steering device 20, the numerical value of the decimal place of the calculated value (r) is set to be within one of numerical ranges of the decimal place which cause those angular deviations corresponding in value to 67% to 100% of the largest one of angular deviations from the calculated motor electrical angle θMe(−2) which deviations are different for the respective rotational ranges (A=−2, −1, 0, 1) in the four rotations in total including two left rotations and two right rotations of the steering wheel 21. The numerical ranges are for example "0.17 to 0.28", "0.39 to 0.42", "0.58 to 0.61" and "0.72 to 0.83". Thus, even where a detection error arises on the mechanical angle θTm of the steering wheel 21 due to the defects in dimensional accuracy of the mechanical components which constitute the pinion shaft 23, the rack shaft 24, the ball screw mechanism 50 or the like, due to the abrasion of the mechanical components or due to the deterioration in temperature characteristic of the electronic components for processing the resolver signals or the like, it can be realized that a rotational range unit and another rotational range unit (in the example shown in FIG. 10 for example, between rotational range A=−2 and rotational range A=−1, between rotational range A=−1 and rotational range A=0 and between rotational range A=0 and rotational range A=1) do not take the same value. Accordingly, even where such error occurs, the absolute steering angle θAm of the steering wheel 21 can be detected precisely, so that the ECU 60 is able to control the motor 40 for assisting the steering manipulation, in dependence on the absolute steering angle θAm of the steering wheel 21 so precisely detected.

It is to be noted that in the method and apparatus for manufacturing the electric power steering device, the step or means for setting the numerical value of the decimal place of the calculated value (r) to one of, e.g., "0.17 to 0.28", "0.39 to 0.42", "0.58 to 0.61" and "0.72 to 0.83" may be replaced by means for setting the reduction gear ratio of the ball screw mechanism 50 by the following equations (9) and (10).

$$\text{Reduction Gear Ratio} = \text{Stroke/Lead} \tag{9}$$

$$\text{Reduction Gear Ratio} = (\text{Module} \times \text{Number of Pinion teeth} \times \pi / \cos(\text{Rack twist angle})) \tag{10}$$

In the foregoing embodiment, description has been made taking the example that the steering wheel 21 are rotated two rotations to the left and two rotations to the left and hence, four rotations in total. The present invention is not limited to th example as taken in the foregoing embodiment. As long as the steering wheel is capable of rotating two rotations or more, the same technological functions and the effects can be obtained, for example, when it is rotated two rotations in total including one to the left and one to the right, when it is rotated six rotations including three to the left and three to the right, or when it is rotated three rotations including 1.5 to the left and 1.5 to the right.

Finally, various features and the attendant advantages of the foregoing embodiment will be summarized as follows:

That is, in the foregoing embodiment, since at least one of the reduction gear ratio of the reduction gear mechanism and the number of pole pairs of the third resolver 44 is set so that a calculated value (r) which is obtained by multiplying the reduction gear ratio with the number of the pole pairs represents a non-integer having a numerical value of the decimal place, it does not occur that the calculated a value (r) has zero as its numerical value of the decimal place, in other words, the calculated value (r) becomes an integer. Thus, the steering angle (0 to 360 degrees) within one revolution of the steering wheel 21 which is obtained from the first steering angle θT1 of the first resolver 35 and the second steering angle θT2 of the second resolver 37 can be made not take the same value within any one rotational range unit (A=−2, −1, 0, 1) as that within another rotational range unit of the plural left and right rotations of the steering wheel 21. Consequently, it becomes possible to detect the absolute rotational position of the steering wheel precisely, so that the motor for assisting the steering manipulation can reliably controlled in dependence on the absolute rotational position of the steering wheel so precisely detected.

Further in the foregoing embodiment, the numerical value of the decimal place of the calculated value (r) is within the predetermined range. That is, the numerical value of the decimal place of the calculated value (r) which is obtained by multiplying the reduction gear ration of the reduction gear mechanism with the number of the pole pairs of the third resolver 44 is within the predetermined range. Thus, in addition to the advantage that the steering angle (0 to 360 degrees) within one revolution of the steering wheel 12 which is obtained from the first steering angle θT1 of the first resolver 35 and the second steering angle θT2 of the second resolver 44 does not take the same value within any one rotational rang unit (A=−2, −1, 0, 1) as that within another rotational range unit of the plural left and right rotations of the steering wheel 21, non-interference area can be secured between one rotational range unit with another unit next thereto. That is, where an detection error in the steering angle of the steering wheel 21 arises due to the errors in the dimensional accuracy of the mechanical components which constitute the steering mechanism or due to the abrasion of such mechanical components or due to errors in the temperature characteristic of the electrical components for processing the resolver signals, there can be provided a room for which the numerical value of the decimal place of the calculated value (r) within one rotational range unit of the steering wheel 21 does not become the same value as that within another range unit next thereto. Thus, even where such error arises, the absolute value of the steering wheel can be detected precisely, so that the motor 40 for assisting the steering manipulation can be controlled reliably in dependence on the absolute value of the steering wheel 21 so precisely detected.

Also in the foregoing embodiment, the numerical value of of the decimal place of the calculated value (r) is within one of the predetermined ranges. This predetermine ranges are numerical ranges of the decimal place which cause those angular deviations corresponding in value to 67% to 100% of the largest one of the angular deviations from the motor electrical angles which deviations are different for the respective rotational range units including at lest one left rotation and one right rotation of said steering wheel.

For example, assuming now that with the neutral position of the steering wheel as a center, one rotation range (0<θ≦360 degrees) to the right of the steering wheel 21 is taken as A=0 and another rotation range (360<θ≦720 degrees) to the right of the steering wheel 21 is taken as A=−1 and that with the neutral position of the steering wheel as the center, one rotation range (0<θ≦−360 degrees) to the left of the steering wheel 21 is taken as A=−1 and another rotation rang (−360<θ≦−720 degrees) to the left of the steering wheel 21 is taken as A=−2, it was found through experiments and researches by the present inventor that the motor electrical angles within other respective one-rotational ranges A=−1, 0, 1 in relation to the motor electrical angle within one rotational range A=−2 respectively have the angular deviations shown in FIG. 10(A) in relation to the numerical value less that the decimal point of the calculated value of the motor electrical angle within one rotational range A=−2. It was also found that where these angular deviations are represented as being turned back each time of reaching a 180-degree electrical angle, there can be obtained the zigzag line K shown in FIG. 10(B) (the thick one-dot chain line in the figure). This zigzag line K is generated by selecting the smallest angular deviation from those angular deviations within each of the respective one-rotational ranges A=−1, 0, 1 for each of the numerical values (0 to 1) of the decimal place.

Herein, the expression "the angular deviations of the motor electrical angles which are different for respective rotational range units including at least one left rotation and one right rotation of the steering wheel" means those represented by the zigzag line K which, as shown in FIG. 10(b), shows the deviations from the motor electrical angles within the one rotational range unit A=−2 in relation to the variation in the numerical value of the decimal place of the calculated value (r). Further, the expression "67% to 100% of the largest one of the angular deviations" can be explained by the aforementioned zigzag line K shown in FIG. 9 for example and means the oblique-line zones in FIG. 9 each of which is within the range of 67% to 100% (60 to 90 degrees) of the largest value (90 degrees) of the zigzag line K.

With the arrangement made above, even where an detection error in the steering angle of the steering wheel 21 arises due to the errors in the dimensional accuracy of the mechanical components which constitute the steering mechanism, due to the abrasion of such mechanical components, or due to the errors in the temperature characteristics of the electrical components for processing the resolver signals, it can be realized that the calculated values of the motor electrical angles do not become the same values between two one-rotational range units (in the instance of FIG. 10(A) for example, between one rotational range A=−2 and one rotational range A=−1, between one rotational range A=−1 and one rotational range A=0, and between one rotational range A=0 and one rotational range A=1) which adjoin to each other due to such errors. Accordingly, even where such an error arises, the absolute position of the steering wheel 21 can be detected precisely, so that the motor 40 for assisting the steering manipulation can be controlled reliably in dependence on the absolute value of the steering wheel 21 so precisely detected.

Furthermore, in the embodiment implementing the method of manufacturing the electric power steering device and in the embodiment realizing the apparatus for manufacturing the same, the step of and means for setting at least one of the reduction gear ratio of the reduction gear mechanism and the number of pole pairs of the third resolver 44 is so set that the calculated value (r) which is obtained by multiplying the reduction gear ratio with the number of pole pairs of the third resolver 44 represents a non-integer having one of "0.17 to 0.28", "0.39 to 0.42", "0.58 to 0.61" and "0.72 to 0.83" as the numerical value of the decimal place thereof. That is, the numerical value of the decimal place of such a calculated value (r) is within on of numerical ranges of the decimal place which cause those angular deviations corresponding in value to 67% to 100% of the largest one of angular deviations from the motor electrical angles θMe. The angular deviations are different for the respective rotational range units (A=−2, −1, 0, 1) including at lest one left rotation and one right rotation of the steering wheel 21. In the concrete, the numerical ranges of the decimal place are represented as "0.17 to 0.28", "0.39 to 0.42", "0.58 to 0.61" and "0.72 to 0.83". The reason why these numerical ranges are provided is that, assuming that with respect to the neutral position of the steering wheel 21 as a center, one rotation range (0<θ≦360 degrees) to the right of the steering wheel is taken as A=0 and another rotation range (360<θ≦720 degrees) to the right of the steering wheel is taken as A=1 and that with respect to the neutral position of the steering wheel as the center, one rotation range (0<θ≦−360 degrees) to the left of the steering wheel is taken as A=−1, and another rotation range (−360<θ≦−720 degrees) to the left of the steering wheel is taken as A=−2, the zigzag line K shown in FIG. 9 can be obtained by choosing the smallest angular deviation (A=−2 as shown in FIG. 10(A)) as the base from those deviations within the respective one-rotational ranges A=−2, −1, 0, 1.

Thus, even where an detection error in the steering angle of the steering wheel 21 arises due to the errors in the dimensional accuracy of the mechanical components which constitute the steering mechanism, due to the abrasion of such mechanical components, or due to errors in the temperature characteristics of the electrical components for processing the resolver signals, it can be realized that the calculated values of the motor electrical angles θMe do not become the same values between two one-rotational ranges (in FIG. 10(A) for example, between one rotational range A=−2 and one rotational range A=−1, between one rotational range A=−1 and one rotational range A=0, and between one rotational range A=0 and one rotational range A=1) which adjoin to each other due to the error. Accordingly, even where such an error arises, the absolute position of the steering wheel 21 can be detected precisely, so that the method and apparatus can be obtained for manufacturing the electric power steering device 20 which is capable of controlling the motor 40 for assisting the steering manipulation reliably in dependence on the absolute value of the steering wheel 21 so precisely detected.

Obviously, numerous modifications and variations of the present invention are possible in light of the above teachings. It is therefore to be understood that within the scope of the appended claims, the present invention may be practiced otherwise than as specifically described herein.

What is claimed is:

1. An electric power steering device having
   a steering wheel;
   a first resolver for detecting a first steering angle indicating the rotational angle of a steering shaft connected to said steering wheel;
   a second resolver having pole pairs different in number from those of said first resolver for detecting a second steering angle indicating the rotational angle of said steering shaft;
   an electric motor for assisting the steering operation performed by a steering mechanism connected to said steering shaft, through a reduction gear mechanism; and
   a third resolver for detecting a motor electrical angle indicating the rotational angle of said electric motor, said electric power steering device being capable of controlling said electric motor based on the rotational position of said steering wheel which is calculated based on said first and second steering angles and said motor electric angle, wherein:
   at least one of the reduction gear ratio of said reduction gear mechanism and the number of pole pairs of said third resolver is set so that a calculated value which is obtained by multiplying said reduction gear ratio with said number of said pole pairs represents a non-integer having a numerical value of the decimal place.

2. The device as set forth in claim 1, wherein said numerical value of the decimal place of said calculated value is within one of predetermined ranges.

3. The device as set forth in claim 2, wherein said predetermined ranges are numerical ranges of the decimal place which cause those angular deviations corresponding in value to 67% to 100% of the largest one of angular deviations from said motor electrical angles which deviations are different for the respective rotational range units including at least one left rotation and one right rotation of said steering wheel.

* * * * *